United States Patent
Nurishi

(10) Patent No.: US 7,095,563 B2
(45) Date of Patent: Aug. 22, 2006

(54) ANAMORPHIC CONVERTER, LENS SYSTEM, AND SHOOTING SYSTEM

(75) Inventor: Ryuji Nurishi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/103,379

(22) Filed: Apr. 11, 2005

(65) Prior Publication Data
US 2005/0225876 A1    Oct. 13, 2005

(30) Foreign Application Priority Data
Apr. 12, 2004 (JP) .............................. 2004-117216

(51) Int. Cl.
*G02B 13/08* (2006.01)
*G02B 13/12* (2006.01)

(52) U.S. Cl. ...................... 359/668; 359/670; 359/671; 359/672

(58) Field of Classification Search ................ 359/668, 359/670, 671, 672, 675
See application file for complete search history.

(56) References Cited
U.S. PATENT DOCUMENTS
6,995,920 B1 *  2/2006  Nurishi ....................... 359/668

FOREIGN PATENT DOCUMENTS

| JP | 2-13916 A | 1/1990 |
|---|---|---|
| JP | 3-25407 A | 2/1992 |
| JP | 0507297 | 10/1992 |
| JP | 5-188271 A | 7/1993 |
| JP | 5-188272 A | 7/1993 |
| JP | 5-188288 A | 7/1993 |
| JP | 6-43362 A | 2/1994 |
| JP | 6-82691 A | 3/1994 |
| JP | 08-184759 | 7/1996 |

* cited by examiner

Primary Examiner—Scott J. Sugarman
Assistant Examiner—Darryl J. Collins
(74) Attorney, Agent, or Firm—Canon U.S.A. Inc IP Division

(57) ABSTRACT

An anamorphic converter, which is disposed at an image side of an image-forming optical system, includes a first lens unit having one of positive and negative optical power, a second lens unit including an anamorphic lens, and a third lens unit having positive optical power, positioned in order from an object side to the image side. The second lens unit is removable from the position between the first lens unit and the third lens unit.

16 Claims, 24 Drawing Sheets

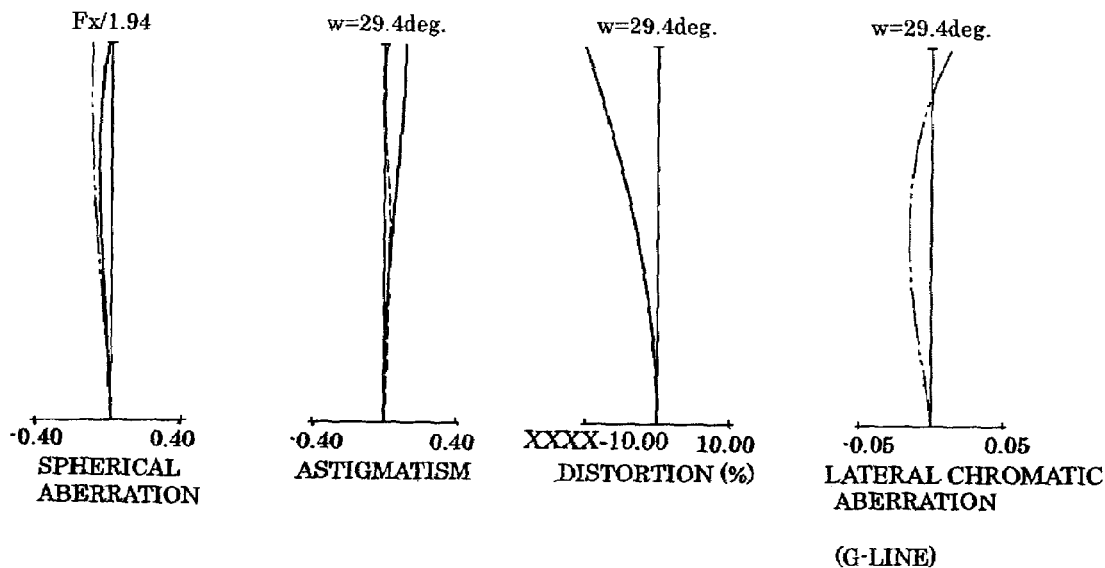
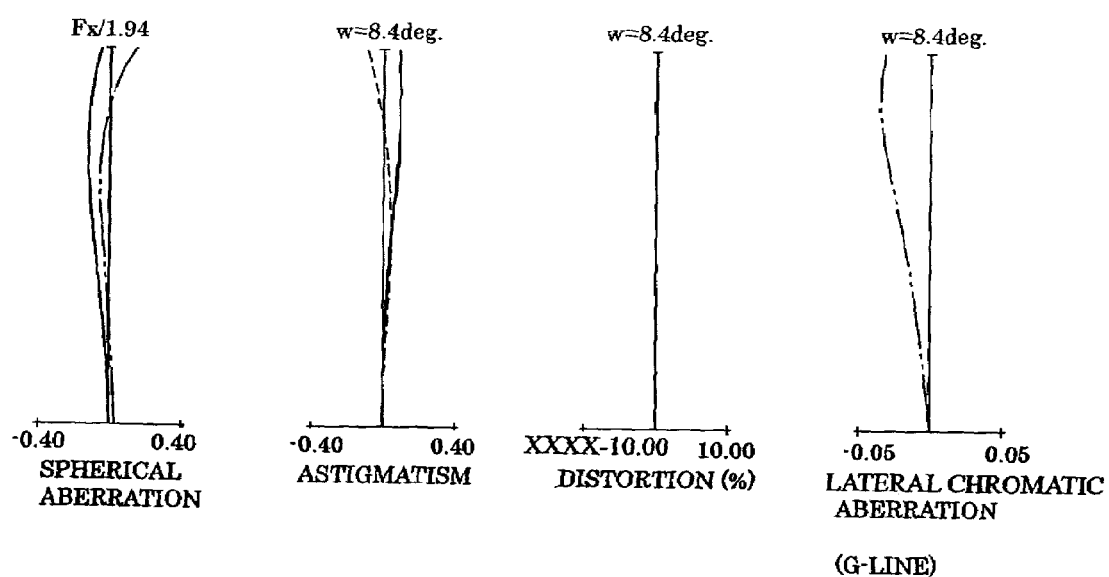

ANAMORPHIC CONVERTER, LENS SYSTEM, AND SHOOTING SYSTEM

BACKGROUND OF THE INVENTION

1. Field of the Invention

The present invention relates to an anamorphic converter disposed at an image side of an image-forming optical system to convert an aspect ratio of an image. In addition, the present invention also relates to a lens system and a shooting system including the anamorphic converter and used in a television camera, a video camera, etc.

2. Description of the Related Art

Various devices for recording/reproducing images with converted aspect ratios have been suggested. In particular, in a typical picture recording/reproducing system of the cinemascope-format with an aspect ratio of 2.35:1 used for motion pictures, an image is optically reduced in the horizontal direction with an anamorphic lens before the image is recorded on film, and then the image on the film is optically enlarged in the horizontal direction with the anamorphic lens when the image is projected onto a screen. In addition, various front converters disposed at an object side of image-forming optical systems have been suggested for use as anamorphic converters. Examples of front converters are disclosed in Japanese Patent Publication No. 48-24048 (see line 34 in the left column to line 32 in the right column of page 2 and FIG. 1), Japanese Patent Laid-Open No. 2-13916 (see lines 10 to 16 in the lower right column of page 2 and FIG. 1), Japanese Patent Laid-Open No. 3-25407 (see line 14 in the upper left column to line 6 in the upper right column of page 4 and FIG. 1), Japanese Patent Laid-Open No. 5-188271 (see paragraphs 0023 to 0025 and FIG. 1), Japanese Patent Laid-Open No. 5-188272 (see paragraphs 0022 to 0023 and FIG. 1), Japanese Patent Laid-Open No. 6-82691 (see paragraphs 0013 to 0015 and FIGS. 1(A) and 1(B)), and Japanese Patent No. 2817074 (see paragraph 0012 and FIGS. 1 to 3).

In addition, rear converters disposed at the image side of image-forming optical systems have also been suggested. An example of a rear converter is disclosed in Japanese Patent No. 3021985 (see paragraphs 0016 to 0017 and FIGS. 1 to 3).

Recently, image quality has improved in the field of video technology and digital cinema systems in which motion pictures shot with high-definition television (HDTV) systems have become popular. In the digital cinema systems, imaging devices with an aspect ratio of 16:9 (1.78:1) are generally used. Accordingly, there are demands for anamorphic converters with which pixels of the imaging devices can be effectively used and the image quality can be improved so that the digital cinema systems can be used for shooting motion pictures with the cinemascope-format with the aspect ratio of 2.35:1.

In addition, there are other various formats for motion pictures such as American vista with an aspect ratio of 1.85:1 and European vista with an aspect ratio of 1.66:1.

In anamorphic converters for digital cinemas, it is preferable that desired aspect-ratio conversion be performed and shading of light from an object not to occur. In addition, preferably, an effective image plane of the image-forming optical system is efficiently used, reduction in the amount of peripheral light is small, and high optical performance is obtained at the entire zoom/focus area. It is also important that the above-described various aspect ratios are obtainable.

As described in Japanese Patent Laid-Open Nos. 2-13916 and 6-82691 and Japanese Patent No. 2817074, front converters are advantageous in that they have simple structures and shading can be prevented irrespective of the conversion magnification by setting a suitable effective diameter. However, astigmatism varies during focusing. Although systems for correcting the astigmatism during focusing are suggested in Japanese Patent Publication No. 48-24048 and Japanese Patent Laid-Open Nos. 3-25407, 5-188271, and 5-188272, a correcting unit included in the converter must be driven in association with the focusing performed by the image-forming optical system, and a complex mechanism is necessary.

In addition, since the size is increased to obtain a sufficient field angle and an F-number, a plurality of large converters having different magnifications must be prepared for obtaining different aspect ratios.

In comparison, rear converters are advantageous in that astigmatism does not vary during focusing.

SUMMARY OF THE INVENTION

The present invention is directed to an anamorphic converter which provides high optical performance and with which a magnification of an aspect ratio can be easily changed.

In one aspect of the present invention, an anamorphic converter is disposed at an image side of an image-forming optical system. The anamorphic converter includes a first lens unit having one of positive and negative optical power, a second lens unit including an anamorphic lens, and a third lens unit having positive optical power. The first, second and third lens units are positioned in order from an object side to the image side. The second lens unit has a first state in which the second lens unit is positioned between the first and third lens units, and a second state in which the second lens unit is removed from the position between the first lens unit and the third lens unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a longitudinal aberration diagram in the x direction according to numerical example 1.

FIG. 8 is another longitudinal aberration diagram in the x direction according to numerical example 1.

DESCRIPTION OF THE EMBODIMENTS

Embodiments of the present invention will be described below with reference to the accompanying drawings.

FIGS. 1, 13, 20, 24, 31, and 38 show optical sectional views (y section and x section) in the vertical direction (y direction) and the horizontal direction (x direction) of lens systems according to first, second, third, fourth, fifth, and sixth embodiments, respectively, of the present invention at the wide-angle end. First, features common to all of the embodiments will be described.

Feature 1

In each embodiment, the lens system includes an image-forming optical system IFS included in commonly used picture-taking lenses (lenses used in video cameras, lenses for broadcasting, etc.) and an anamorphic converter AC disposed closer to an image side than the image-forming optical system IFS.

In addition, in each embodiment, the anamorphic converter AC includes a first lens unit G1 which is fixed and which has a positive or negative refractive power (optical power=reciprocal of focal length), a second lens unit G2 including an anamorphic lens, and a third lens unit G3 which is fixed and which has a positive refractive power, in that order from the image-forming optical system (that is, in the order from the object side).

The second lens unit G2 is moveable (insertable/extractable) in a direction perpendicular to an optical axis, as shown by the arrow in the figures, between a first state in which it is disposed in a region between the first lens unit G1 and the third lens unit G3 (state shown in the figures) and a second state in which it is removed from this region.

Feature 2

In each embodiment, the anamorphic converter AC satisfies Equation (10) presented below. Equation (10) shows a condition for easily switching a magnification of an aspect ratio.

Figure 2:
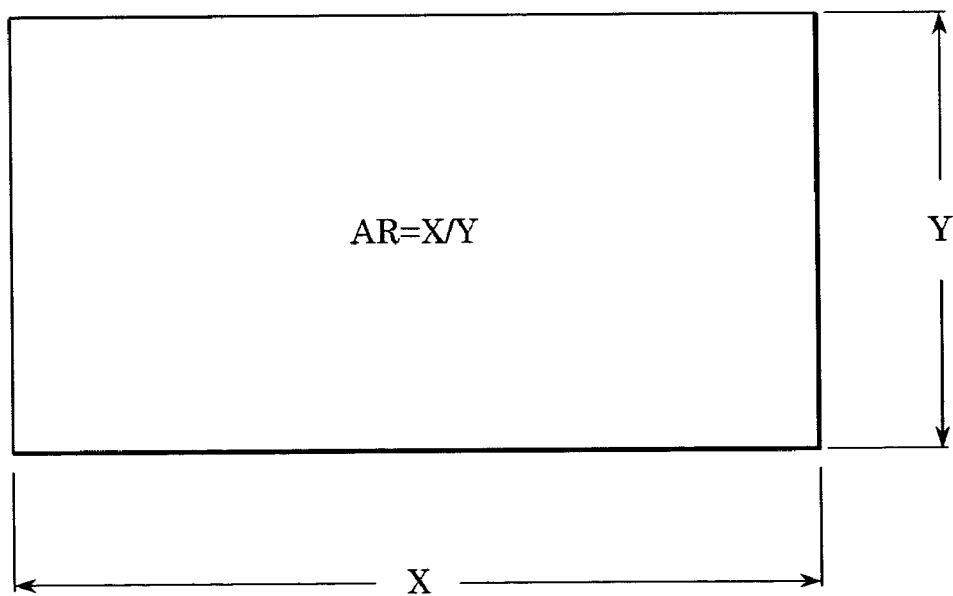
FIG. 2 is a schematic diagram showing an aspect ratio.

As shown in FIG. 2, an aspect ratio AR of an image plane is expressed as follows:

$$AR = X/Y \tag{1}$$

where X and Y are the width and height, respectively, of the image plane.

Figure 3:
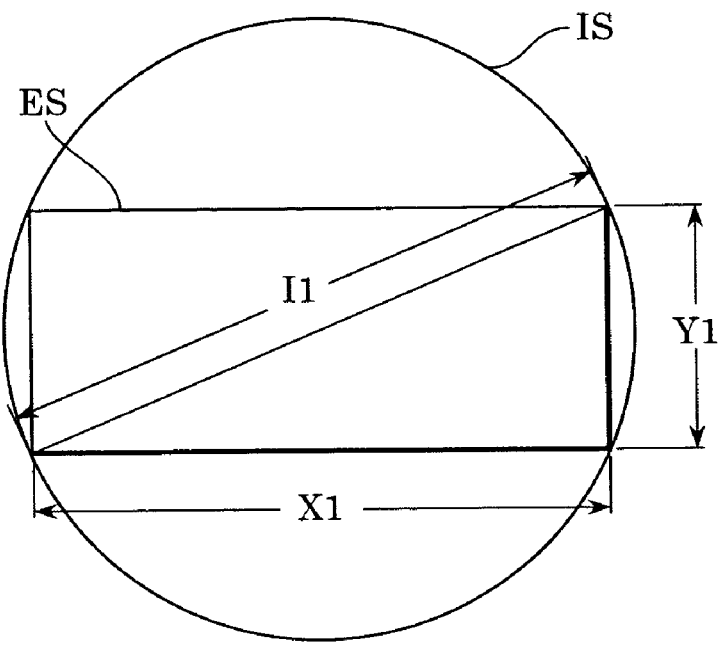
FIG. 3 is a schematic diagram showing an image-forming section in an image plane of an image-forming optical system.
Figure 4:
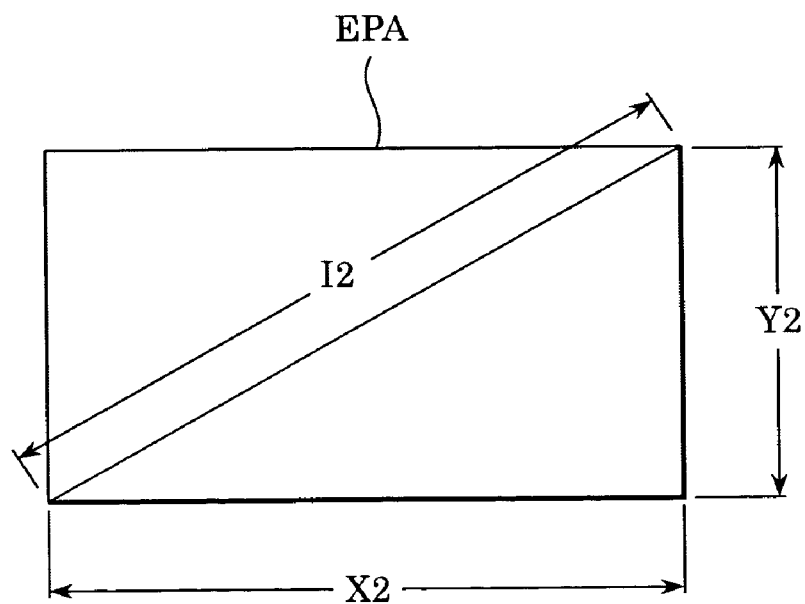
FIG. 4 is a schematic diagram showing an effective image pickup area of an imaging device.

FIG. 3 is a schematic diagram showing an image-forming section (image circle) IS of the image-forming optical system IFS, and FIG. 4 is a schematic diagram showing an effective image pickup area EPA of an imaging device. With reference to FIG. 3, X1 and Y1 are the width and height, respectively, of an effective screen ES corresponding to (inscribed in) the image-forming section IS in the image plane (light-receiving surface of the imaging device) of the image-forming optical system IFS, and AR1 is an aspect ratio thereof. In addition, with reference to FIG. 4, X2 and Y2 are the width and height, respectively, of the effective image pickup area EPA of the imaging device, and AR2 is an aspect ratio thereof. The relationship between AR1 and AR2 can be expressed as follows:

$$AR1/AR2=(X1 \cdot Y2)/(X2 \cdot Y1) \quad (2)$$

Figure 5:
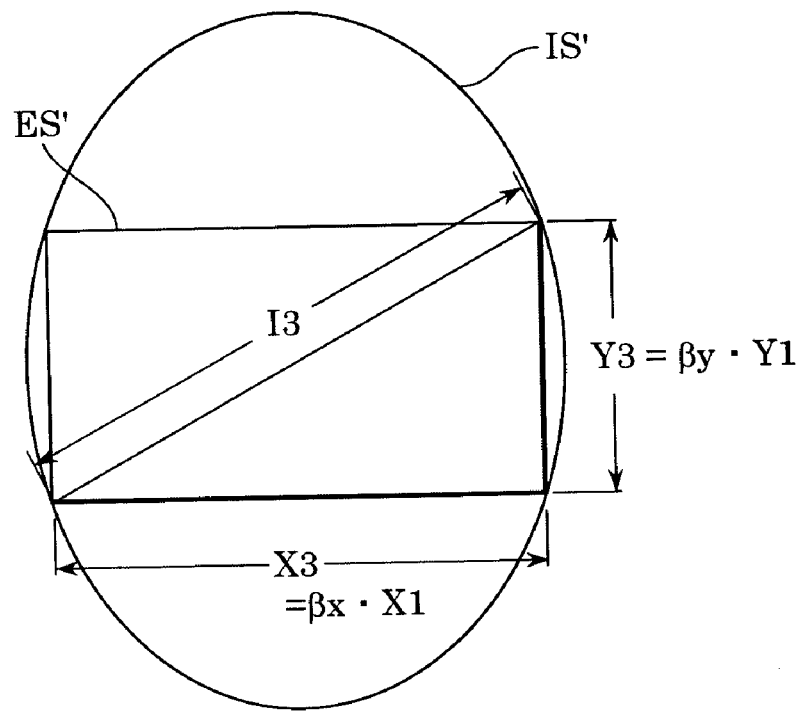
FIG. 5 is a schematic diagram showing an image-forming section after a conversion performed by an anamorphic converter.

FIG. 5 is a schematic diagram showing an image-forming section IS' of the image-forming optical system IFS after the aspect-ratio conversion by the anamorphic converter AC and an effective screen ES' corresponding to the image-forming section IS'. In order to adequately convert the aspect ratio, a horizontal magnification βx and a vertical magnification βy of the anamorphic converter AC satisfy the following equations:

$$\beta x = X2/X1 \quad (3)$$

$$y = Y2/Y1 \quad (4)$$

From Equations (2) to (4), a condition for an ideal aspect-ratio conversion is obtained as follows:

$$(AR1 \cdot x)/(AR2 \cdot \beta y)=1 \quad (5)$$

Figure 6:
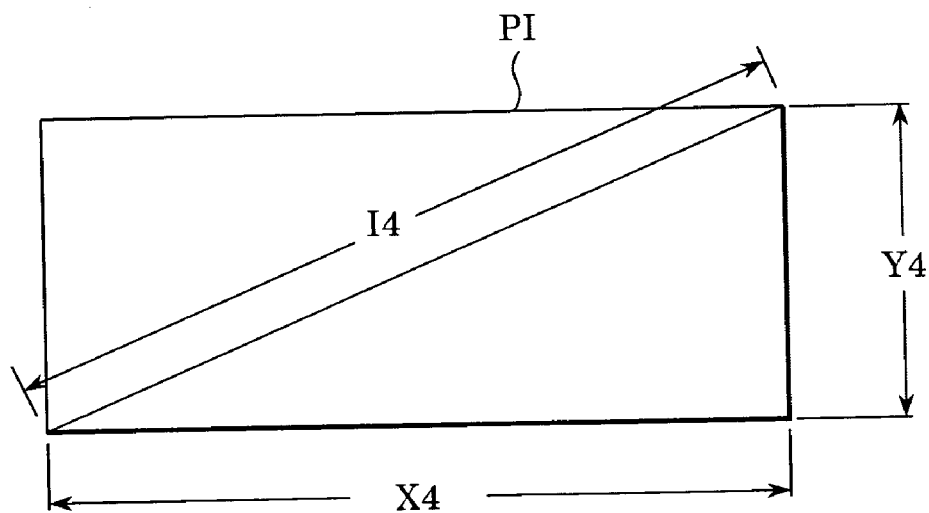
FIG. 6 is a schematic diagram showing a display area of a projected image.

FIG. 6 is a schematic diagram showing an image of a motion picture projected on a screen. When the image is projected, an aspect-ratio conversion reverse to that performed when the image is shot must be performed so that the aspect ratio returns to the initial value. Accordingly, when X4 and Y4 are the width and height, respectively, of a projected image P1, X4 and Y4 are expressed as follows:

$$X4 = \beta x' \cdot X2 \quad (6)$$

$$Y4 = \beta y' \cdot Y2 \quad (7)$$

where magnifications βx' and βy' are expressed as follows using an arbitrary constant m:

$$\beta x' = m/\beta x \quad (8)$$

$$\beta y' = m/\beta y \quad (9)$$

Accordingly, when the aspect ratio AR2 of the imaging device is given and a desired aspect ratio AR1 is to be converted to AR1", it is determined from Equation (5) that an anamorphic converter having magnifications βx" and βy" which satisfy the following equation must be used:

$$(AR1'' \cdot \beta x'')/(AR2 \cdot \beta y'')=1 \quad (10)$$

In each embodiment, since the second lens unit G2 including the anamorphic lens is insertable/extractable, the aspect-ratio magnification can be easily switched without replacing the entire body of the anamorphic converter AC.

Feature 3

In each embodiment, in the state in which the second lens unit G2 is removed from the anamorphic converter AC (that is, in the second state), the first and third lens units G1 and G3 function as a magnification-converting optical system.

More specifically, when the anamorphic converter AC is in the state in which the second lens unit G2 is removed from between the first and third lens units G1 and G3, βx=βy is satisfied and a function as a magnification-converting optical system is provided accordingly.

Feature 4

In the anamorphic converter AC of each embodiment, the first lens unit G1 may have a negative refractive power.

This is a condition for setting the arrangement of refractive powers with which the aspect-ratio conversion is performed without primary imaging by the image-forming optical system IFS and obtaining high optical performance.

In order to prevent primary imaging, both of the focal-length magnifications βx and βy must be positive. In addition, the anamorphic converter AC has a positive refractive power in both of the above-described x and y sections to suppress an effect of increasing the focal length. Thus, an anamorphic converter without primary imaging which provides a sufficient field angle and which can maintain a long exit pupil can be obtained.

Feature 5

In the anamorphic converter AC of each embodiment, the first lens unit G1 may have a positive refractive power.

This is a condition for setting a structure with which the aspect-ratio conversion is performed with primary imaging by the image-forming optical system IFS and obtaining high optical performance.

Figure 47:
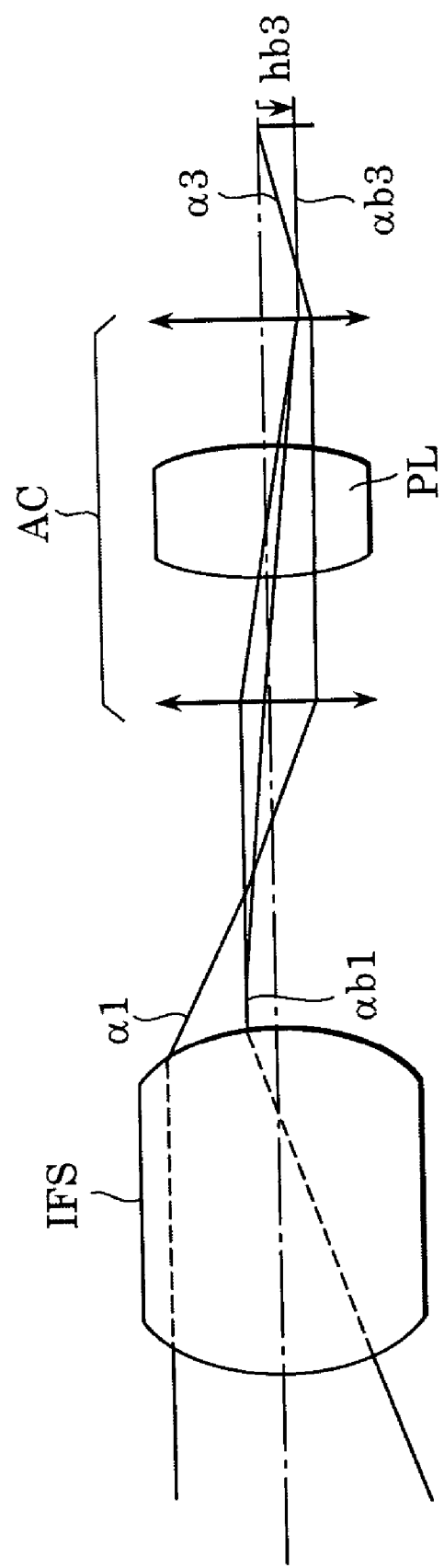
FIG. 47 is a schematic diagram showing an anamorphic converter with primary imaging.

FIG. 47 is a schematic diagram showing an anamorphic converter AC with primary imaging. In order to reform a primary image obtained by the image-forming optical system IFS, both of the focal-length magnifications βx and βy must be negative. In addition, in order to cover the peripheral light in the image-forming optical system IFS, an entrance pupil must substantially be the same as an exit pupil of the image-forming optical system IFS.

A typical lens for broadcasting including a digital cinema lens is basically used together with a color-separation optical system, and therefore has a long exit pupil and is substantially telecentric on the image side. Accordingly, an optical system which is substantially telecentric on both the object side and the image side is required as a converter.

As shown in FIG. 47, in the anamorphic converter AC with primary imaging, a light beam (paraxial primary light ray α1 and off-axis primary light ray αb1) from the image-forming optical system IFS is made substantially afocal by a positive lens PL. Accordingly, an output height hb3 of an off-axis primary light ray αb3 from the rearmost surface of the anamorphic converter AC is reduced, and the amount of peripheral light is prevented from being reduced. In addition, since the inclination angle of emission of the off-axis primary light ray αb3 is reduced, the exit pupil is increased and an influence of color shading caused by the color separation optical system does not easily occur. In the figure, α3 denotes a paraxial primary light ray emitted from the anamorphic converter AC.

Since the anamorphic converter AC with primary imaging must be telecentric on both sides, the anamorphic converter AC includes at least two positive lens units and a refractive power of the overall anamorphic converter AC is very small and is close to zero.

Here, the state in which a system is approximately afocal means that the following expression is satisfied:

$$-0.1 < \alpha < +0.1$$

where α is an inclination angle standardized by the inclination angle of emission of the on-axis light ray from the rearmost surface.

In addition, since aberrations including chromatic aberration, astigmatism, and image-plane distortion are corrected in the primary image obtained by the image-forming optical system IFS, chromatic aberration, astigmatism, image-plane distortion, etc., of the anamorphic converter AC must also be corrected.

In the anamorphic converter AC, when φi, νi, and Ni are the refractive power, the Abbe number, and the refractive index, respectively, of each element included in the first to third lens units G1 to G3, a condition for chromatic aberration correction is expressed as follows:

$$\Sigma((\phi i/\nu i) \approx 0 \tag{11}$$

In addition, the Petzval condition is expressed as follows:

$$\Sigma((\phi i/Ni)=0 \tag{12}$$

Since normal optical materials satisfy νi>0 and Ni>0, in order to satisfy Expressions (11) and (12), the anamorphic converter AC with primary imaging includes at least one negative lens element.

In addition, when one of lens gaps in the anamorphic converter AC is made approximately afocal and the lens unit including the anamorphic lens (second lens unit G2) is provided, an anamorphic converter with primary imaging is obtained.

Feature 6

In each embodiment, the anamorphic converter AC satisfies the following condition:

$$0.9 < (AR1 \cdot \beta x)/(AR2 \cdot \beta y) < 1.1 \tag{13}$$

where $\beta x$ is the focal-length magnification in an arbitrary x section including an optical axis AXL of the overall anamorphic converter AC, $\beta y$ is the focal-length magnification in the y section which includes the optical axis AXL and which is perpendicular to the x section, AR1 is the aspect ratio of the image-forming section in the image plane of the image-forming optical system IFS, and AR2 is the aspect ratio of the effective image pickup area of the imaging device.

This is a condition for performing a satisfactory aspect-ratio conversion. Although Equation (5) must be satisfied to perform an ideal aspect-ratio conversion, an error within ±10% causes only a small visual influence in practice. Accordingly, a satisfactory aspect-ratio conversion can be performed when Expression (13) is satisfied.

Feature 7

In each embodiment, the anamorphic converter AC satisfies the following expression:

$$1 \leq (AR2^2+1) \cdot \beta \beta y^2/(AR1^2+1) < 2.6 \tag{14}$$

This is a condition for setting the relationship between the focal-length magnification βy and the aspect ratios AR1 and AR2 with which shading is prevented and a sufficient field angle is obtained in the case in which features 1 to 6 are provided.

When the anamorphic converter AC is disposed at the image side of the image-forming optical system IFS, the image circle is limited by an effective diameter of the image-forming optical system. Therefore, the field angle cannot be increased even when the magnification is reduced to below 1, and shading occurs at the peripheral region.

With reference to FIG. 3, a diameter I1 of the image circle IS in the image-forming optical system is expressed as follows:

$$I1 = (X1^2+Y1^2)^{1/2} = Y1 \cdot (AR1^2+1)^{1/2} \tag{15}$$

In addition, with reference to FIG. 4, a diagonal length I2 of the effective image pickup area EPA of the imaging device is expressed as follows:

$$I2 = (X2^2+Y2^2)^{1/2} = \beta y \cdot Y1 * (AR2^2+1)^{1/2} \tag{16}$$

In addition, with reference to FIG. 5, a diagonal length I3 of an image after the aspect-ratio conversion by the anamorphic converter AC is expressed as follows:

$$I3 = \{(\beta x \cdot X1)^2+(\beta y \cdot Y1)^2\}^{1/2} = \beta y \cdot Y1 \cdot (AR2^2+1)^{1/22}\}^{1/2} \tag{17}$$

Accordingly, in order to obtain a state in which the image after the aspect-ratio conversion covers the diagonal length of the effective image pickup area of the imaging device and shading is prevented, I3≧I2 must be satisfied. Accordingly, the following expressions are obtained from Equations (16) and (17):

$$I3^2/I2^2 \geq 1 \tag{18}$$

$$\{\beta y^2 \cdot (AR2^2+1)\}/(AR1^2+1) \geq 1 \tag{19}$$

When the value of Expression (14) is reduced to below the lower limit thereof, shading occurs. In addition, when the value of Expression (14) is increased to above the upper limit thereof, the field angle after the conversion is reduced with respect to the field angle of the image-forming optical system IFS, and the image-forming section IS of the image-forming optical system IFS cannot be used effectively.

Feature 8

In each embodiment, the second lens unit G2 may be rotatable about the optical axis. In such a case, the direction of the aspect-ratio conversion can be selected arbitrarily.

Feature 9

In each embodiment, the object side and the image side of the second lens unit G2 may be reversible. In such a case, focal-length magnifications βx' and βy' after the reversal are calculated as follows:

$$\beta x' = 1/\beta x$$

$$\beta y' = 1/\beta y$$

Accordingly, an aspect-ratio conversion different from that before the reversal can be performed.

Feature 10

In each embodiment, a gap between at least two lens elements included in the second lens unit G2 may be variable. In such a case, the focal-length magnification can be varied continuously.

Other Features

1. The second lens unit G2 receives substantially collimated light.

2. The second lens unit G2 may include at least one first anamorphic lens having a positive optical power in a section A which is perpendicular to the optical axis and at least one second anamorphic lens having a negative optical power in the section A.

The second lens unit G2 can change at least an incidence height of an on-axis marginal light ray on the second lens unit G2 in the section A in order to change the focal-length magnifications βx and βy in the aspect-ratio conversion, and outputs the on-axis marginal light ray in a substantially parallel state so that an image is formed without generating on-axis astigmatism. This can be achieved by applying the above-described structure.

3. The third lens unit G3 can include a plurality of positive lens elements and one or more negative lens elements and satisfies the following expression:

$$\nu p3 - \nu n3 > 20 \quad (20)$$

where $\nu p3$ is an average Abbe number of the positive lens elements and $\nu n3$ is an average Abbe number of the negative lens elements.

The third lens unit G3 must adequately form an image of the approximately parallel light from the second lens unit G2 while adequately correcting aberrations. Aberrations including spherical aberration, coma aberration, and image-plane distortion can be corrected by combining a plurality of positive lens elements and one or more negative lens elements. Expression (20) shows a condition for correcting the chromatic aberration. When the value in this expression is reduced to below the lower limit, the refractive powers of both the positive and negative lens elements are increased and it becomes difficult to correct the above-described aberrations.

4. The first lens unit G1 can include one or more positive lens elements and a plurality of negative lens elements and satisfies the following expression:

$$\nu n1 - \nu p1 > 10 \quad (21)$$

where $\nu p1$ is an average Abbe number of the positive lens elements and $\nu n1$ is an average Abbe number of the negative lens elements.

In the anamorphic converter without primary imaging, the first lens unit G1 must collimate the converging light from the image-forming optical system while correcting aberrations. Aberrations including spherical aberration, coma aberration, and image-plane distortion can be corrected by combining a plurality of negative lens elements and one or more positive lens elements. Expression (21) shows a condition for correcting the chromatic aberration. When the value in this expression is reduced to below the lower limit, the refractive powers of both the negative and positive lens elements increase and it becomes difficult to correct the above-described aberrations.

5. The first lens unit G1 can include a plurality of positive lens elements and one or more negative lens elements and satisfies the following expression:

$$\nu p1 - \nu n1 > 10 \quad (22)$$

where $\nu p1$ is an average Abbe number of the positive lens elements and $\nu n1$ is an average Abbe number of the negative lens elements.

In the anamorphic converter with primary imaging, the first lens unit G1 must collimate the diverging light from the primary image of the image-forming optical system while correcting aberrations. Aberrations including spherical aberration, coma aberration, and image-plane distortion can be corrected by combining a plurality of positive lens elements and one or more negative lens elements. Expression (22) shows a condition for correcting the chromatic aberration. When the value in this expression is reduced to below the lower limit, the refractive powers of both the positive and negative lens elements increase and it becomes difficult to correct the above-described aberrations.

6. The anamorphic lens used in each embodiment is, for example, a toric lens or a cylindrical lens in which optical powers in the x and y directions are different from each other.

7. A diffractive optical element may also be adhered to a lens surface of the anamorphic lens used in each embodiment so that the anamorphic lens provides a function of diffraction.

8. The image-forming optical system IFS according to each embodiment may either be a variable power system (zoom lens) or a constant power system (fixed focal length lens).

FIRST EMBODIMENT

Figure 1:
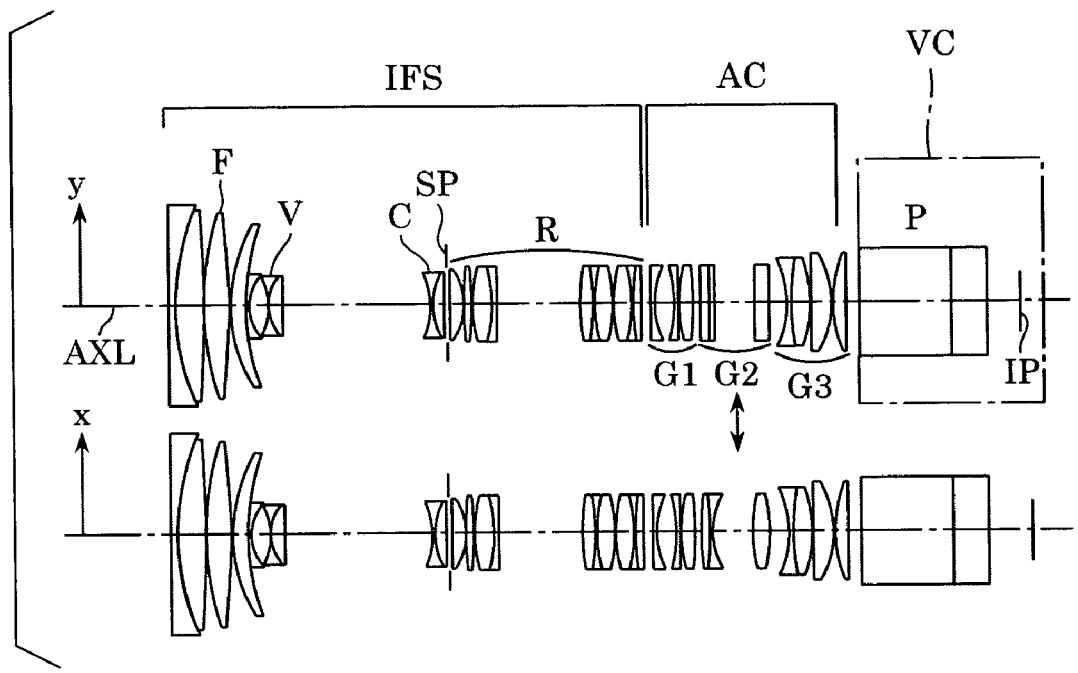
FIG. 1 shows sectional views in the x and y directions of a lens system according to a first embodiment (numerical example 1) of the present invention at the wide-angle end.

In the anamorphic converter AC according to the first embodiment shown in FIG. 1, primary imaging is not performed. The anamorphic converter AC shown in FIG. 1 corresponds to numerical example 1 described below.

Figure 42:
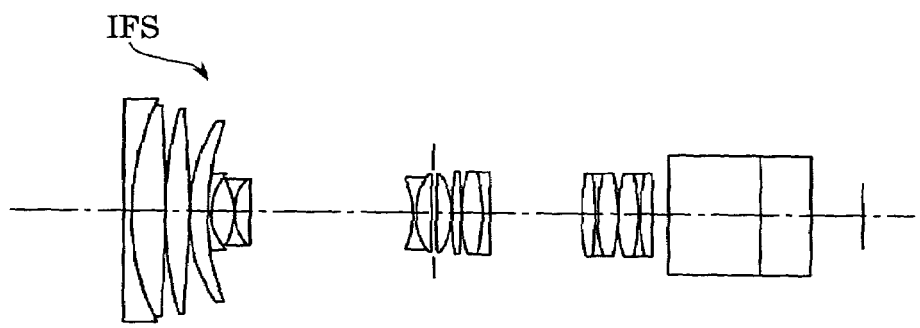
FIG. 42 is a sectional view showing a lens system before the insertion of the anamorphic converter according to numerical examples 1 to 6.
Figure 43:
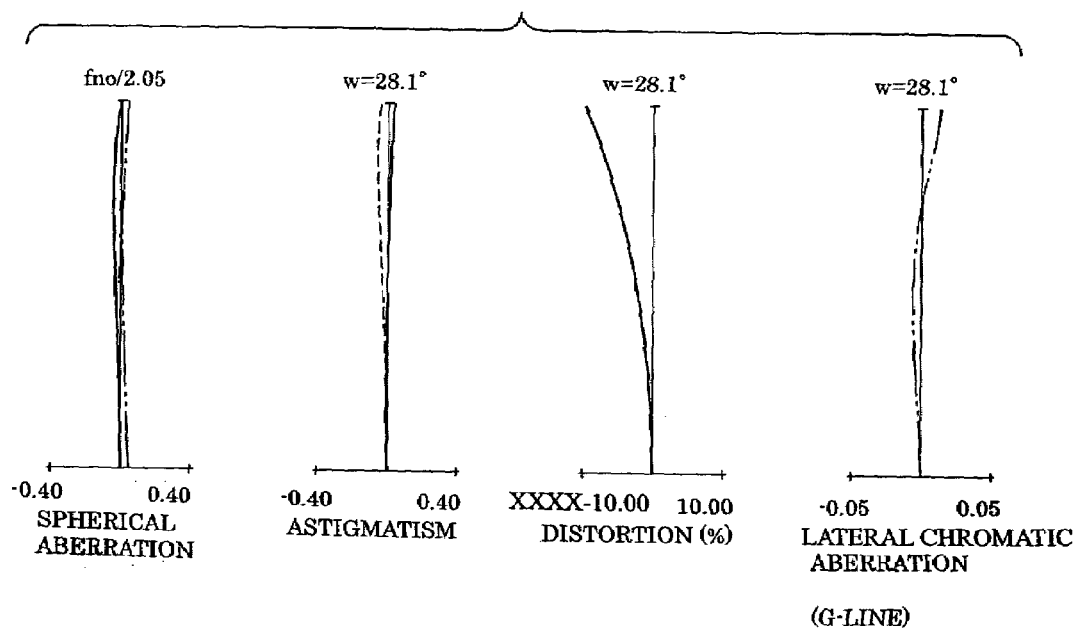
FIG. 43 is a longitudinal aberration diagram obtained by the lens system before the insertion of the anamorphic converter according to numerical examples 1 to 6.
Figure 44:
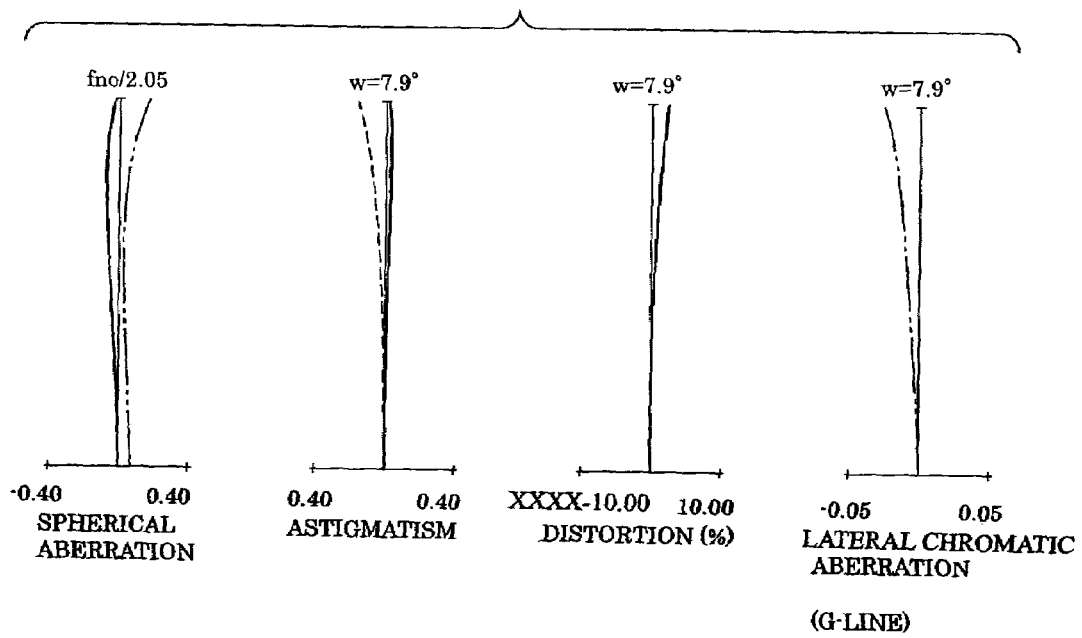
FIG. 44 is another longitudinal aberration diagram obtained by the lens system before the insertion of the anamorphic converter according to numerical examples 1 to 6.
Figure 45:
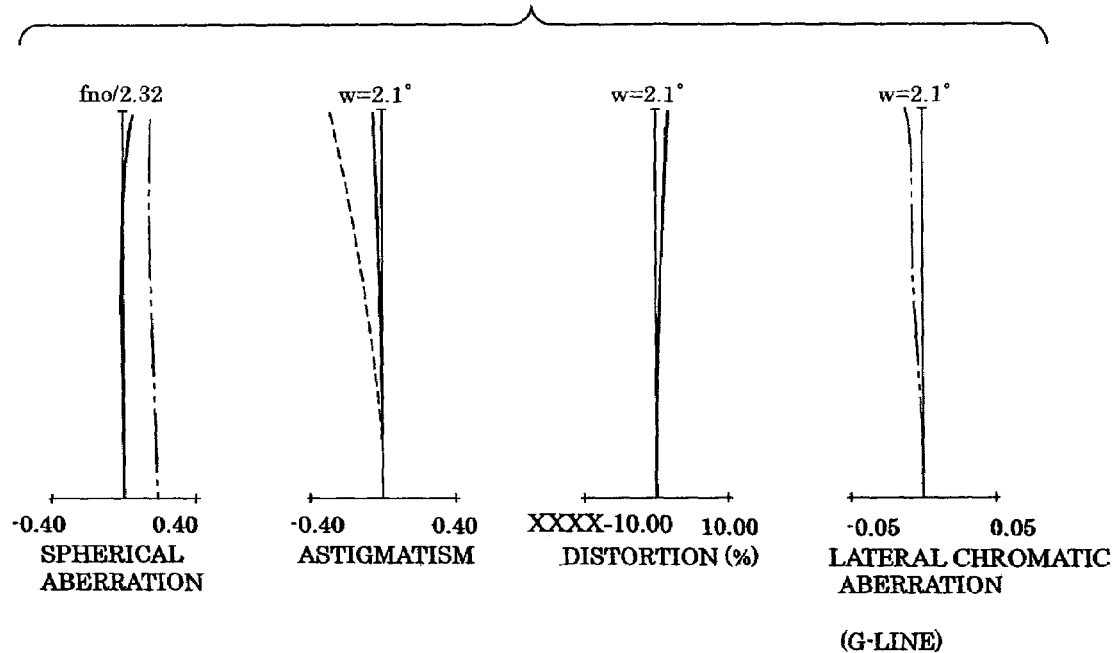
FIG. 45 is another longitudinal aberration diagram obtained by the lens system before the insertion of the anamorphic converter according to numerical examples 1 to 6.
Figure 46:
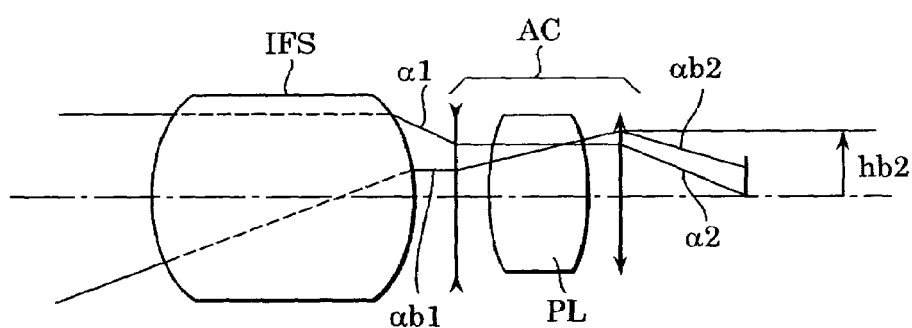
FIG. 46 is a schematic diagram showing an anamorphic converter without primary imaging.

FIG. 42 shows an optical sectional view of a zoom lens which serves as the image-forming optical system IFS according to numerical examples 1 to 6. FIGS. 43 to 45 show the longitudinal aberration diagrams of the zoom lens according to numerical examples 1 to 6.

Components included in the image-forming optical system (zoom lens) IFS shown in FIG. 1 will be described below in the order from the object side. With reference to FIG. 1, a front focusing lens F has a positive refractive power, and a variator V for varying the magnification and has a negative refractive power. The variator V moves along an optical axis toward the image plane for the variation of magnification from the wide-angle end to the telephoto end.

In addition, a compensator C has a negative refractive power. The compensator C moves nonlinearly along the optical axis with a trajectory which is convex toward the object side in order to correct the displacement of the image plane during the variation of magnification. Thus, a variable power system is defined by the variator V and the compensator C.

In addition, a diaphragm SP and a relay lens R which serves as a fourth lens unit and which has a positive refractive power are provided. The relay lens R is fixed during the variation of magnification.

With reference to FIG. 1, a glass block P such as a color separation prism and an optical filter is provided in a shooting apparatus VC, such as a video camera. In addition, an imaging device IP such as a CCD sensor and a CMOS sensor is also provided in the shooting apparatus VC. Although the shooting apparatus VC is shown by the one-dot chain line in FIG. 1, it is omitted in other embodiments.

Next, the structure of the anamorphic converter AC according to numerical example 1 will be described below. The anamorphic converter AC includes a first lens unit G1 which includes two negative lens elements and a single positive lens element and which has a negative refractive power, a second lens unit G2 which includes three cylindrical lens elements, and a third lens unit G3 which has an image-forming function, which includes three positive lens elements and a single negative lens element, and which has a positive refractive power. A focal length f1 of the first lens unit G1 and a focal length f3 of the third lens unit G3 are as follows:

$$f1 = -67.728 \quad (23)$$

$$f3 = +380.534 \quad (24)$$

In addition, the value corresponding to Expression (20) is 28.6, and the value corresponding to Expression (21) is 17.0. Both of these values satisfy the corresponding conditions, and accordingly the aberrations are sufficiently corrected.

Each of the three cylindrical lens elements included in the second lens unit G2 has a curvature only in the x direction, and reduces only the focal length in the x direction. The aspect ratio AR1 of the image-forming section in the image plane of the image-forming optical system IFS and the aspect ratio AR2 of the effective image pickup area EPA of the imaging device IP are as follows:

$$AR1=2.35 \quad (25)$$

$$AR2=1.78 \quad (26)$$

In addition, the magnification $\beta x$ in the x direction and the magnification $\beta y$ in the y direction are as follows:

$$\beta x=0.947 \quad (27)$$

$$\beta y=1.252 \quad (28)$$

Therefore, the following equation is satisfied:

$$(AR1 \cdot \beta x)/(AR2 \cdot \beta y)=1.00 \quad (29)$$

Accordingly, the condition of Expression (13) is satisfied, and the anamorphic converter according to the present embodiment provides excellent optical performance and performs good aspect-ratio conversion.

In addition, focal lengths fACx and fACy of the anamorphic converter AC itself in the x and y directions are as follows:

$$fACx=+22.348 \quad (30)$$

$$fACy=+32.232 \quad (31)$$

Accordingly, the refractive power is positive in both the x and y directions.

The cylindrical lens used in the present embodiment (numerical example) is made of glass.

In numerical example 1 described below, fx denotes the focal length in the x direction, fy denotes the focal length in the y direction, Fx is the F-number in the x direction, and Fy is the F-number in the y direction. In addition, $2\omega$ is the field angle. In addition, ri is the radius of curvature of the i$^{th}$ lens surface from the object side, di is the distance between the i$^{th}$ and (i+1)$^{th}$ lens surfaces, and ni and vi (shown as vi in each table) are the refractive index and the Abbe number, respectively, of the material of the i$^{th}$ lens element from the object side. In each table, ri=0.000 represents ri=∞. These reference characters are common to all of the embodiments (numerical examples) shown below.

Figure 9:
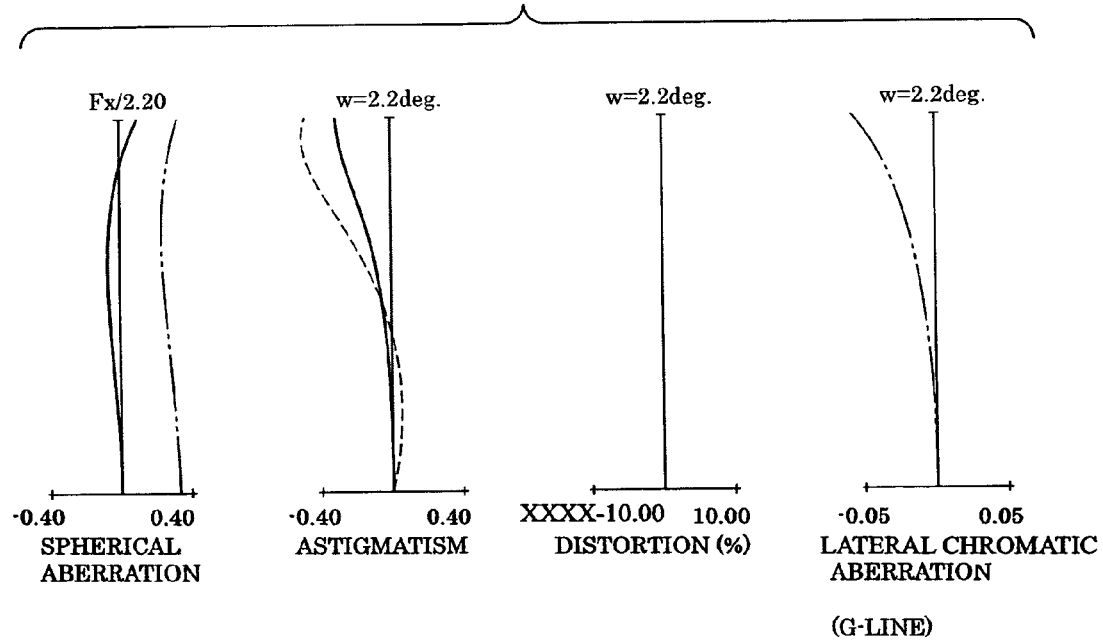
FIG. 9 is another longitudinal aberration diagram in the x direction according to numerical example 1.
Figure 10:
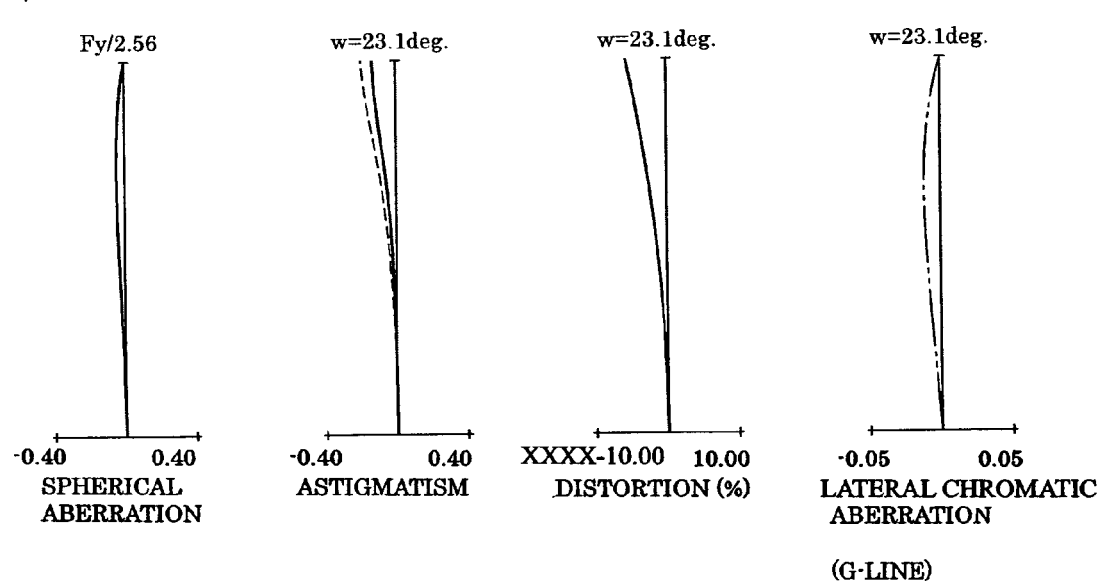
FIG. 10 is a longitudinal aberration diagram in the y direction according to numerical example 1.
Figure 11:
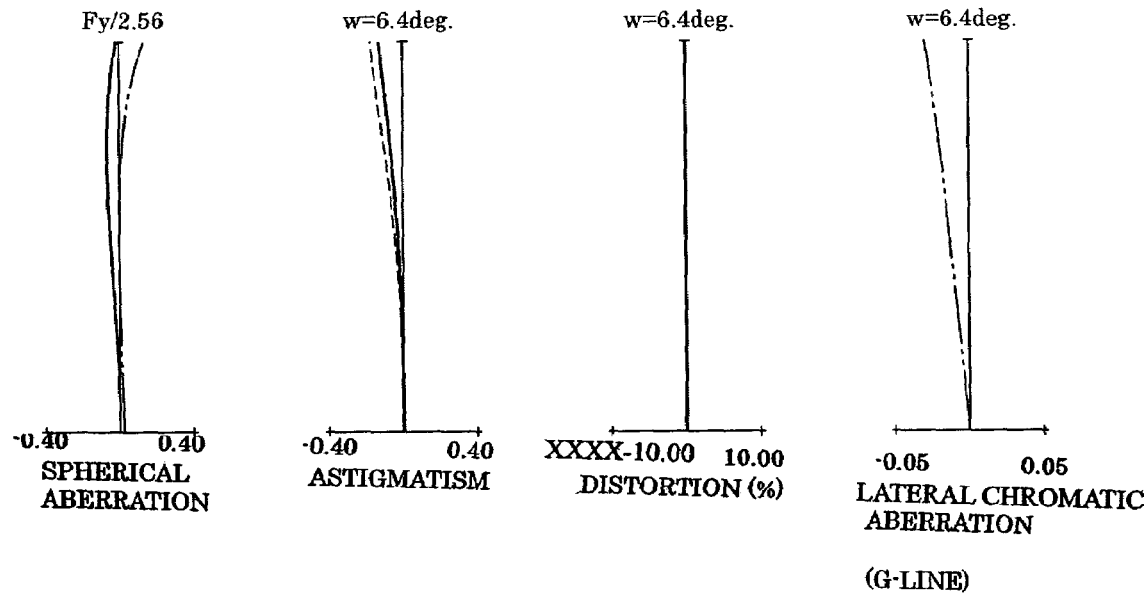
FIG. 11 is another longitudinal aberration diagram in the y direction according to numerical example 1.
Figure 12:
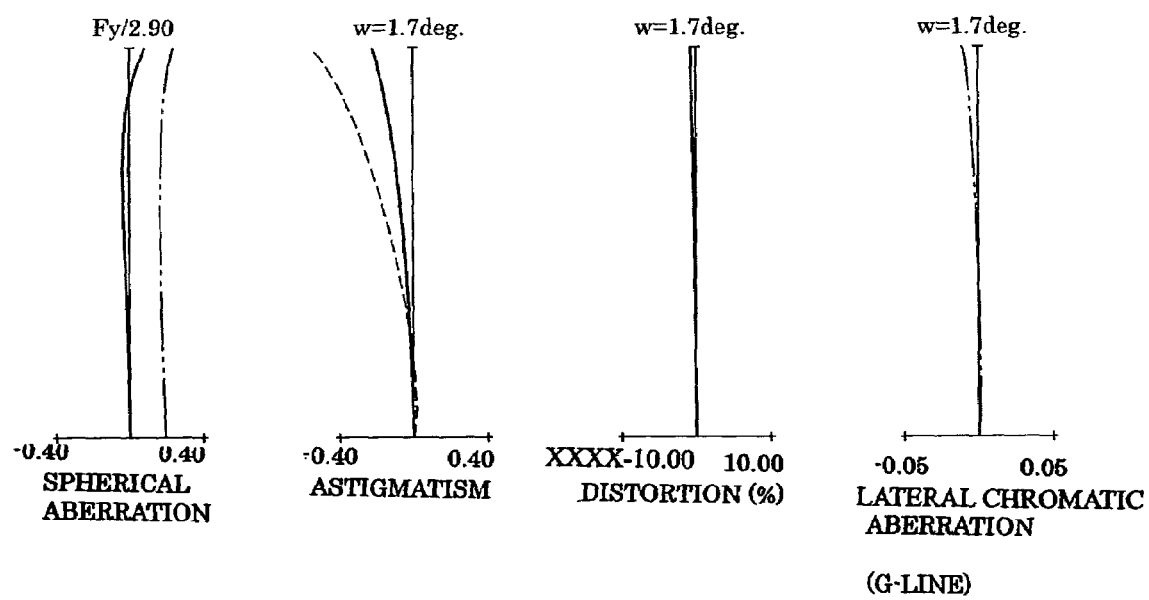
FIG. 12 is another longitudinal aberration diagram in the y direction according to numerical example 1.

FIG. 7 shows a longitudinal aberration diagram in the x direction according to numerical example 1 obtained when fx=9.8 mm, fy=12.9 mm, and the object distance is 2.5 m. FIG. 8 shows a longitudinal aberration diagram in the x direction according to numerical example 1 obtained when fx=37.4 mm, fy=49.4 mm, and the object distance is 2.5 m. FIG. 9 shows a longitudinal aberration diagram in the x direction according to numerical example 1 obtained when fx=143.2 mm, fy=189.0 mm, and the object distance is 2.5 m. FIG. 10 shows a longitudinal aberration diagram in the y direction according to numerical example 1 obtained when fx=9.8 mm, fy=12.9 mm, and the object distance is 2.5 m. FIG. 11 shows a longitudinal aberration diagram in the y direction according to numerical example 1 obtained when fx=37.4 mm, fy=49.4 mm, and the object distance is 2.5 m. FIG. 12 shows a longitudinal aberration diagram in the y direction according to numerical example 1 obtained when fx=143.2 mm, fy=189.0 mm, and the object distance is 2.5 m.

In each aberration diagram, the solid line shows the e-line, the dashed line shows the F-line, the one-dot chain line shows the C-line, and the two-dot chain line shows the g-line (this also applies to the aberration diagrams of other embodiments). In addition, in each aberration diagram, $\omega$ is shown as w.

NUMERICAL EXAMPLE 1

Parameters of numerical example 1 are as follows:
fx=9.760 to 143.173
fy=12.885 to 189.030
Fx=1.94 to 2.20
Fy=2.56 to 2.90
$2\omega x$=58.8 to 4.4 degrees
$2\omega y$=46.2 to 3.3 degrees

TABLE 1

| | | | |
|---|---|---|---|
| r 1 = 1169.481 | d 1 = 2.40 | n 1 = 1.81265 | v 1 = 25.4 |
| r 2 = 98.429 | d 2 = 10.83 | n 2 = 1.51825 | v 2 = 64.2 |
| r 3 = −265.170 | d 3 = 0.20 | | |
| r 4 = 124.037 | d 4 = 8.29 | n 3 = 1.60548 | v 3 = 60.7 |
| r 5 = −281.395 | d 5 = 0.20 | | |
| r 6 = 51.197 | d 6 = 6.46 | n 4 = 1.64254 | v 4 = 60.1 |
| r 7 = 97.915 | d 7 = variable | | |
| r 8 = 71.045 | d 8 = 0.90 | n 5 = 1.82017 | v 5 = 46.6 |
| r 9 = 17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48915 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.564 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53430 | v17 = 48.8 |
| r30 = −30.063 | d30 = 1.20 | n18 = 1.80811 | v18 = 46.6 |
| r31 = 113.246 | d31 = 0.20 | | |
| r32 = 56.783 | d32 = 2.98 | n19 = 1.55098 | v19 = 45.8 |
| r33 = −10000.000 | d33 = 2.40 | | |
| r34 = 118.792 | d34 = 1.50 | n20 = 1.88815 | v20 = 40.8 |
| r35 = 23.524 | d35 = 7.79 | | |
| r36 = −47.979 | d36 = 1.50 | n21 = 1.88815 | v21 = 40.8 |
| r37 = −235.160 | d37 = 0.20 | | |
| r38 = 58.013 | d38 = 4.86 | n22 = 1.85504 | v22 = 23.8 |
| r39 = −80.709 | d39 = 3.00 | | |
| r40 = 0.000 | d40 = 3.00 | n23 = 1.81264 | v23 = 25.4 |
| r41 = 0.000 | d41 = 1.50 | n24 = 1.77621 | v24 = 49.6 |
| r42 = 0.000 | d42 = 13.93 | | |
| r43 = 0.000 | d43 = 5.84 | n25 = 1.62286 | v25 = 60.3 |
| r44 = 0.000 | d44 = 7.00 | | |
| r45 = −24.454 | d45 = 1.50 | n26 = 1.80642 | v26 = 35.0 |
| r46 = 68.213 | d46 = 6.48 | n27 = 1.48915 | v27 = 70.2 |
| r47 = −44.146 | d47 = 0.20 | | |
| r48 = −4171.602 | d48 = 7.52 | n28 = 1.62286 | v28 = 60.3 |
| r49 = −29.849 | d49 = 0.20 | | |
| r50 = 42.035 | d50 = 5.28 | n29 = 1.62286 | v29 = 60.3 |
| r51 = −10000.000 | d51 = 4.00 | | |
| r52 = 0.000 | d52 = 33.00 | n30 = 1.61170 | v30 = 46.4 |
| r53 = 0.000 | d53 = 13.20 | n31 = 1.51825 | v31 = 64.2 |
| r54 = 0.000 | | | |

* r40 to r44 are cylindrical lenses.

TABLE 1-continued

Curvatures in x and y directions are as follows:

|  | x | y |
|---|---|---|
| r40 | 646.757 | 0 |
| r41 | −132.193 | 0 |
| r42 | 40.341 | 0 |
| r43 | 65.604 | 0 |
| r44 | −68.100 | 0 |

| Focal Length fx | 9.760 | 37.379 | 143.173 |
|---|---|---|---|
| fy | 12.885 | 49.351 | 189.030 |
| Variable Range | | | |
| d7 | 0.39 | 33.92 | 49.55 |
| d12 | 52.91 | 14.80 | 3.78 |
| d15 | 1.55 | 6.13 | 1.53 |

SECOND EMBODIMENT

Figure 13:
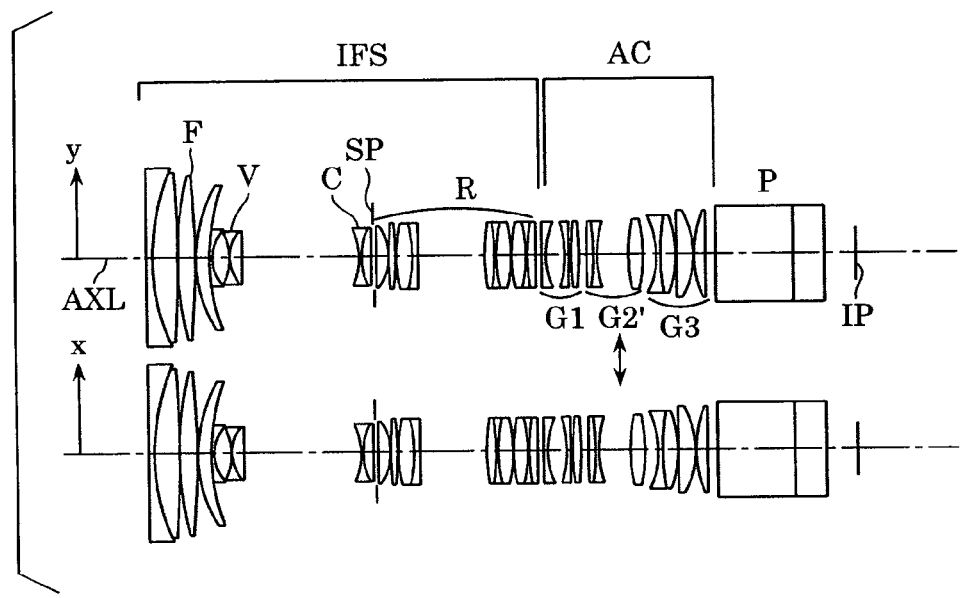
FIG. 13 shows sectional views in the x and y directions of a lens system according to a second embodiment (numerical example 2) of the present invention at the wide-angle end.

The anamorphic converter AC according to the second embodiment (numerical example 2) shown in FIG. 13 is similar to the anamorphic converter AC with primary imaging according to the first embodiment except the structure of the second lens unit G2 is changed. The structures of the zoom lens which functions as the image-forming optical system IFS and the first and third lens units G1 and G3 in the anamorphic converter AC are similar to those of the first embodiment.

Next, the structure of the anamorphic converter AC according to numerical example 2 will be described below. The anamorphic converter AC includes a first lens unit G1 which has a positive refractive power, a second lens unit G2' including three toric lens elements, and a third lens unit G3 which has an image-forming function and a positive refractive power. Each of the three cylindrical lens elements included in the second lens unit G2' has different curvatures in the x and y directions, and increases the focal length in the y direction with respect to that in the x direction. The aspect ratio AR1 of the image-forming section in the image plane of the image-forming optical system IFS and the aspect ratio AR2 of the effective image pickup area of the imaging device IP are as follows:

$$AR1=1.85 \quad (32)$$

$$AR2=1.78 \quad (33)$$

In addition, the magnification βx in the x direction and the magnification βy in the y direction are as follows:

$$\beta x=0.991 \quad (34)$$

$$\beta y=1.030 \quad (35)$$

Therefore, the following equation is satisfied:

$$(AR1 \cdot \beta x)/(AR2 \cdot \beta y)=1.00 \quad (36)$$

Accordingly, the condition of Expression (13) is satisfied, and the anamorphic converter according to the present embodiment provides excellent optical performance and performs ideal aspect-ratio conversion.

Figure 14:
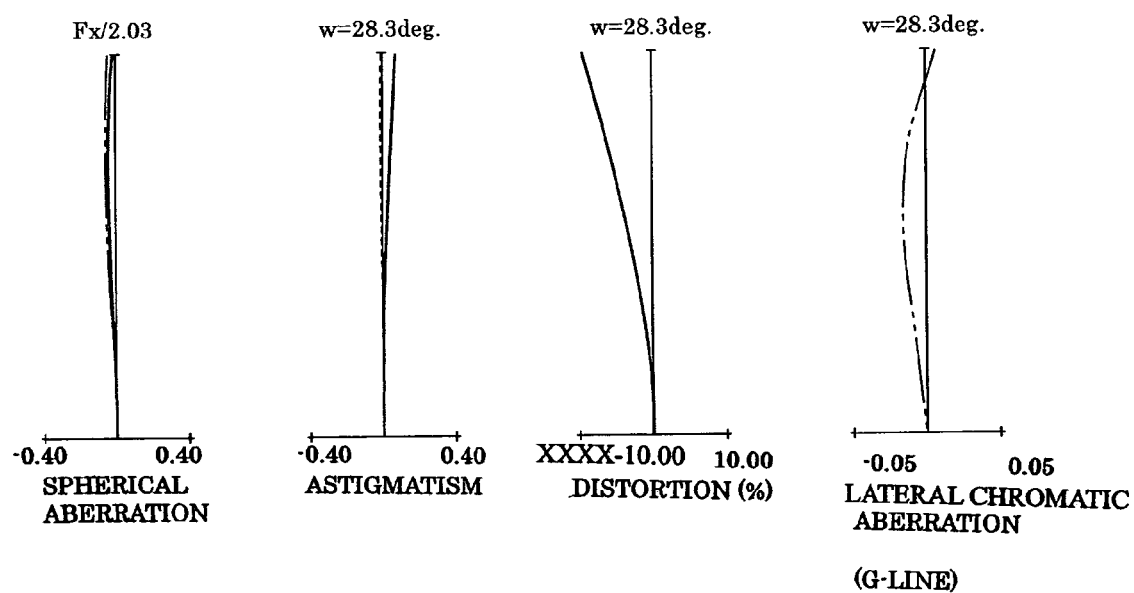
FIG. 14 is a longitudinal aberration diagram in the x direction according to numerical example 2.
Figure 15:
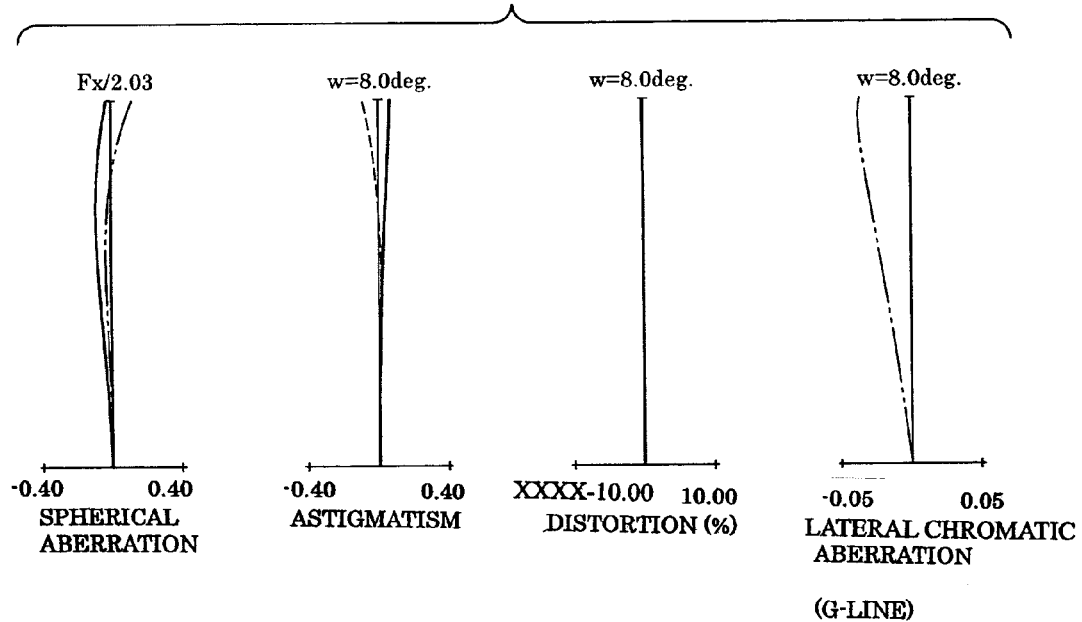
FIG. 15 is another longitudinal aberration diagram in the x direction according to numerical example 2.
Figure 16:
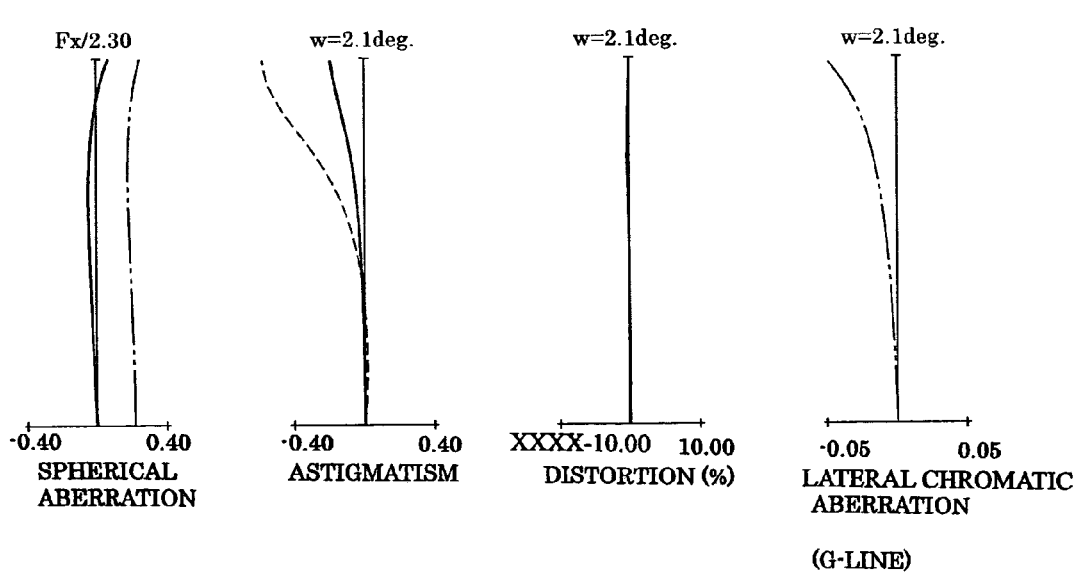
FIG. 16 is another longitudinal aberration diagram in the x direction according to numerical example 2.
Figure 17:
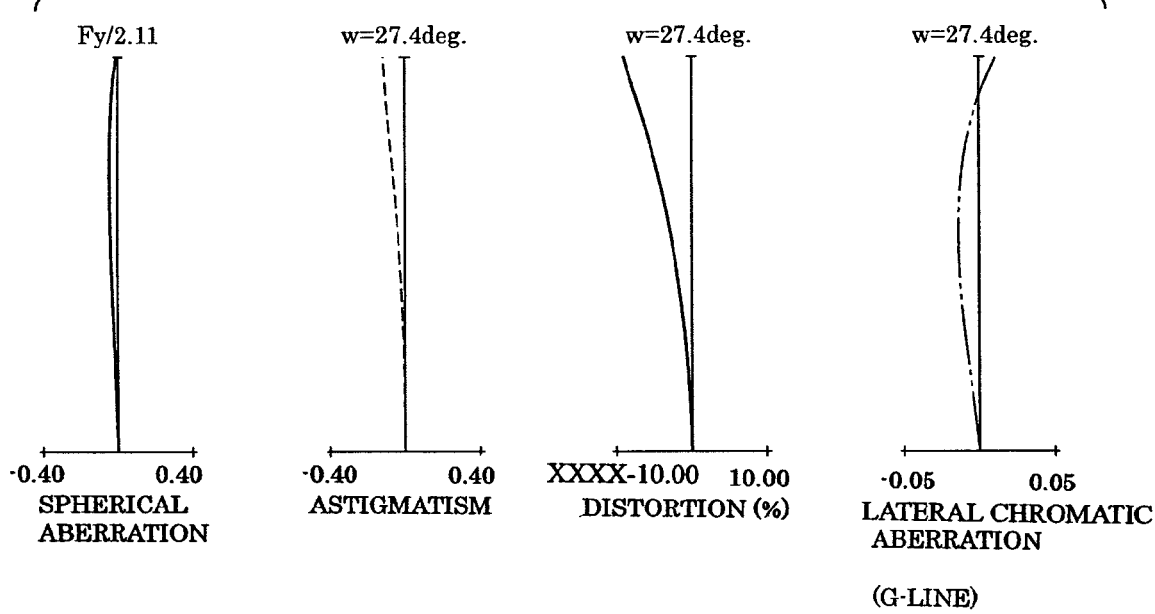
FIG. 17 is a longitudinal aberration diagram in the y direction according to numerical example 2.
Figure 18:
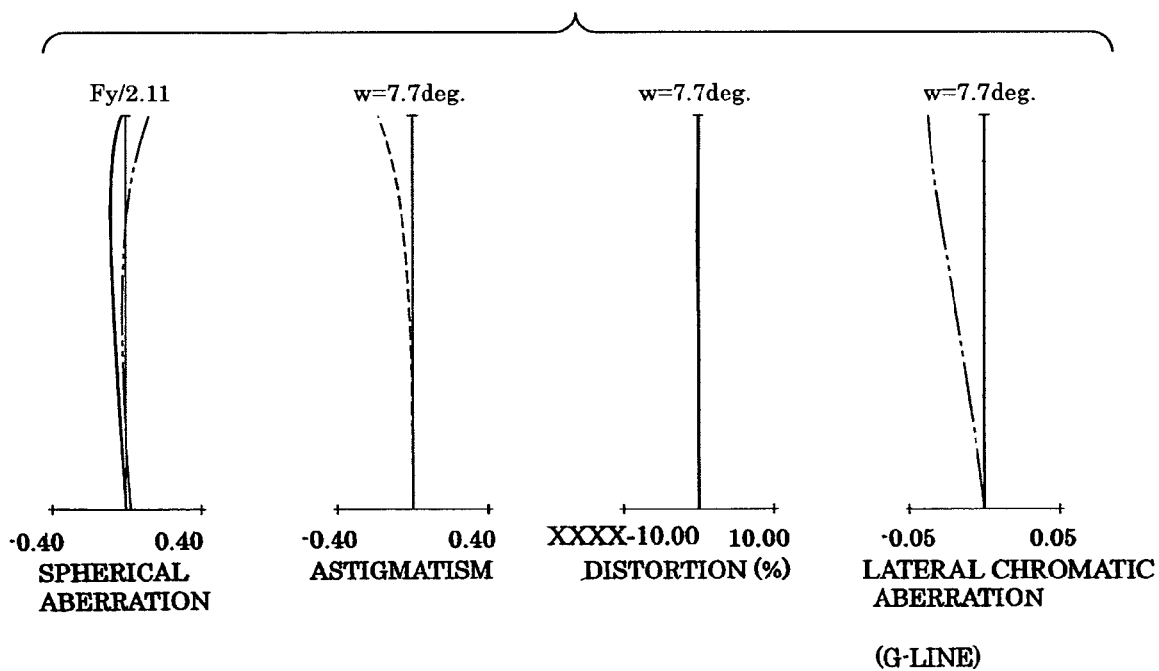
FIG. 18 is another longitudinal aberration diagram in the y direction according to numerical example 2.
Figure 19:
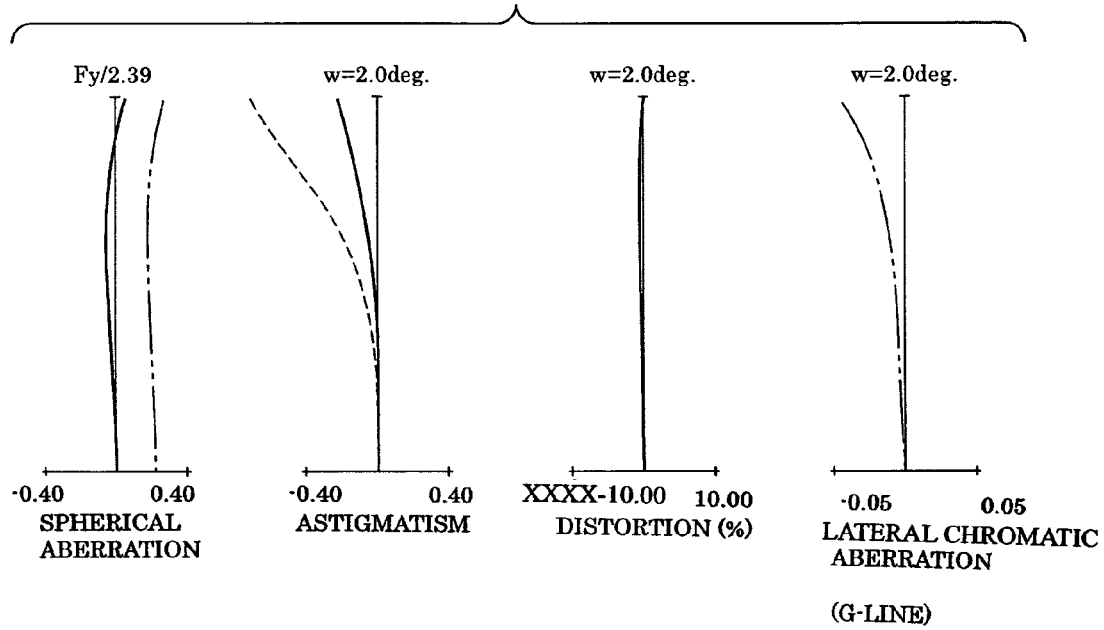
FIG. 19 is another longitudinal aberration diagram in the y direction according to numerical example 2.

FIG. 14 shows a longitudinal aberration diagram in the x direction according to numerical example 2 obtained when fx=10.2 mm, fy=10.6 mm, and the object distance is 2.5 m. FIG. 15 shows a longitudinal aberration diagram in the x direction according to numerical example 2 obtained when fx=39.1 mm, fy=40.7 mm, and the object distance is 2.5 m. FIG. 16 shows a longitudinal aberration diagram in the x direction according to numerical example 2 obtained when fx=149.7 mm, fy=155.8 mm, and the object distance is 2.5 m. FIG. 17 shows a longitudinal aberration diagram in the y direction according to numerical example 2 obtained when fx=10.2 mm, fy=10.6 mm, and the object distance is 2.5 m. FIG. 18 shows a longitudinal aberration diagram in the y direction according to numerical example 2 obtained when fx=39.1 mm, fy=40.7 mm, and the object distance is 2.5 m. FIG. 19 shows a longitudinal aberration diagram in the y direction according to numerical example 2 obtained when fx=149.7 mm, fy=155.8 mm, and the object distance is 2.5 m.

NUMERICAL EXAMPLE 2

Parameters of numerical example 2 are as follows:
fx=10.206 to 149.729
fy=10.618 to 155.764
Fx=2.03 to 2.30
Fy=2.11 to 2.39
2ωx=56.6 to 4.2 degrees
2ωy=54.8 to 4.0 degrees

TABLE 2

| r 1 = 1169.481 | d 1 = 2.40 | n 1 = 1.81265 | v 1 = 25.4 |
|---|---|---|---|
| r 2 = 98.429 | d 2 = 10.83 | n 2 = 1.51825 | v 2 = 64.2 |
| r 3 = −265.170 | d 3 = 0.20 | | |
| r 4 = 124.037 | d 4 = 8.29 | n 3 = 1.60548 | v 3 = 60.7 |
| r 5 = −281.395 | d 5 = 0.20 | | |
| r 6 = 51.797 | d 6 = 6.46 | n 4 = 1.64254 | v 4 = 60.1 |
| r 7 = 97.915 | d 7 = variable | | |
| r 8 = 71.045 | d 8 = 0.90 | n 5 = 1.82017 | v 5 = 46.6 |
| r 9 = −17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48916 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.564 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53438 | v17 = 48.8 |
| r30 = −30.063 | d30 = 1.20 | n18 = 1.80811 | v18 = 46.6 |
| r31 = 113.248 | d31 = 0.20 | | |
| r32 = 56.783 | d32 = 2.98 | n19 = 1.55098 | v19 = 45.8 |
| r33 = −10000.000 | d33 = 2.40 | | |
| r34 = 118.792 | d34 = 1.50 | n20 = 1.88815 | v20 = 40.8 |
| r35 = 23.524 | d35 = 7.79 | | |
| r36 = −47.979 | d36 = 1.50 | n21 = 1.88815 | v21 = 40.8 |
| r37 = −235.160 | d37 = 0.20 | | |
| r38 = 58.013 | d38 = 4.86 | n22 = 1.85504 | v22 = 23.8 |
| r39 = −80.709 | d39 = 3.00 | | |
| r40 = 584.961 | d40 = 3.00 | n23 = 1.81264 | v23 = 25.4 |
| r41 = −185.750 | d41 = 1.50 | n24 = 1.77621 | v24 = 49.6 |
| r42 = 55.837 | d42 = 13.93 | | |
| r43 = 71.599 | d43 = 5.84 | n25 = 1.62286 | v25 = 60.3 |
| r44 = −120.593 | d44 = 7.00 | | |
| r45 = −24.454 | d45 = 1.50 | n26 = 1.80642 | v26 = 35.0 |
| r46 = 68.213 | d46 = 6.48 | n27 = 1.48915 | v27 = 70.2 |
| r47 = −44.146 | d47 = 0.20 | | |
| r48 = −4171.602 | d48 = 7.52 | n28 = 1.62286 | v28 = 60.3 |
| r49 = −29.849 | d49 = 0.20 | | |
| r50 = 42.035 | d50 = 5.28 | n29 = 1.62286 | v29 = 60.3 |
| r51 = −10000.000 | d51 = 4.00 | | |

TABLE 2-continued

| | | | |
|---|---|---|---|
| r52 = 0.000 | d52 = 33.00 | n30 = 1.61170 | v30 = 46.4 |
| r53 = 0.000 | d53 = 13.20 | n31 = 1.51825 | v31 = 64.2 |
| r54 = 0.000 | | | |

* r40 to r44 are cylindrical lenses.

Curvatures in x and y directions are as follows:

| | x | y |
|---|---|---|
| r40 | 567.567 | 584.961 |
| r41 | −158.236 | −185.750 |
| r42 | 47.220 | 55.837 |
| r43 | 69.801 | 71.599 |
| r44 | −86.321 | −120.593 |
| Focal Length fx | 10.206 | 39.091 | 149.729 |
| fy | 10.618 | 40.666 | 155.764 |
| Variable Range | | | |
| d7 | 0.39 | 33.92 | 49.55 |
| d12 | 52.91 | 14.80 | 3.78 |
| d15 | 1.55 | 6.13 | 1.53 |

THIRD EMBODIMENT

Figure 20:
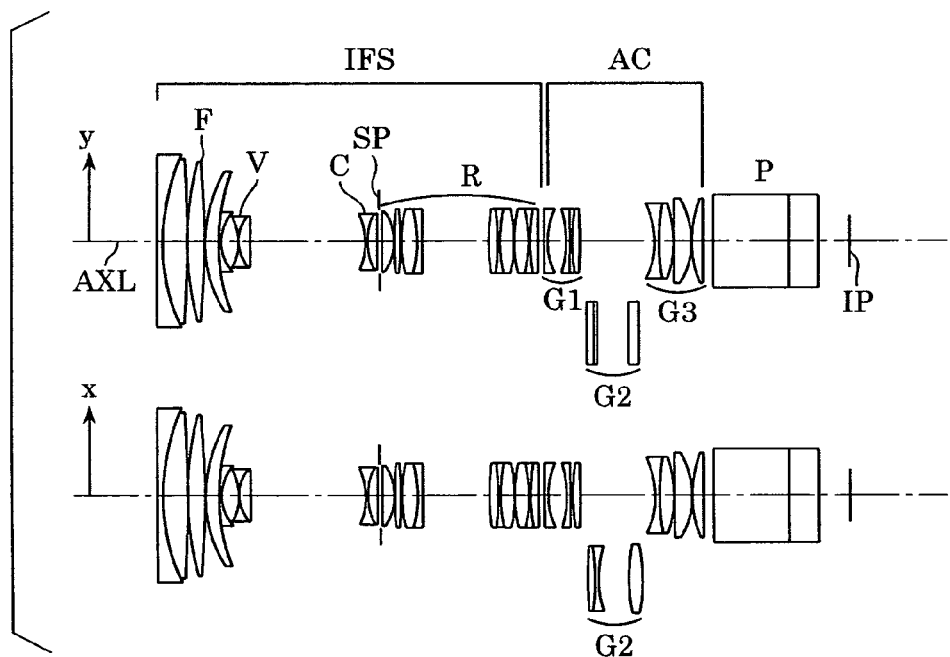
FIG. 20 shows sectional views of a lens system according to a third embodiment (numerical example 3) of the present invention at the wide-angle end.

The anamorphic converter AC according to the third embodiment (numerical example 3) shown in FIG. 20 corresponds to the anamorphic converter AC according to the first embodiment in the state in which the second lens unit G2 is removed (second state). The structures of the zoom lens which function as the image-forming optical system IFS and the first and third lens units G1 and G3 in the anamorphic converter AC are similar to those of the first embodiment.

Next, the structure of the anamorphic converter AC according to numerical example 3 will be described below. The anamorphic converter AC includes a first lens unit G1 which has a positive refractive power and a third lens unit G3 which has an image-forming function and a positive refractive power.

The magnification βx in the x direction and the magnification βy in the y direction are as follows:

βx=βy=1.302                                                    (37)

Thus, a function as a teleconverter (magnification-converting optical system) is provided.

Figure 21:
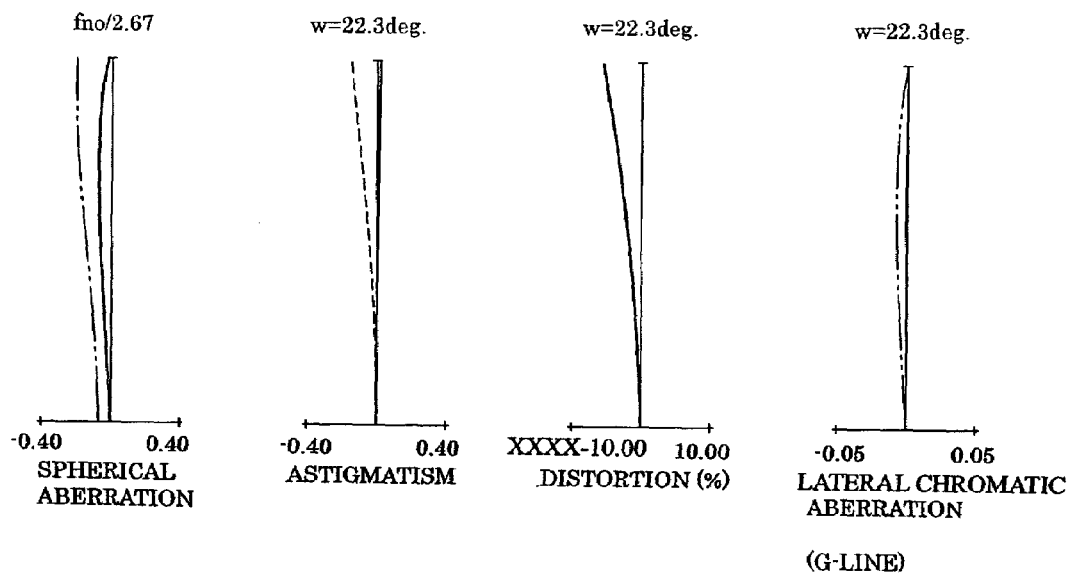
FIG. 21 is a longitudinal aberration diagram according to numerical example 3.
Figure 22:
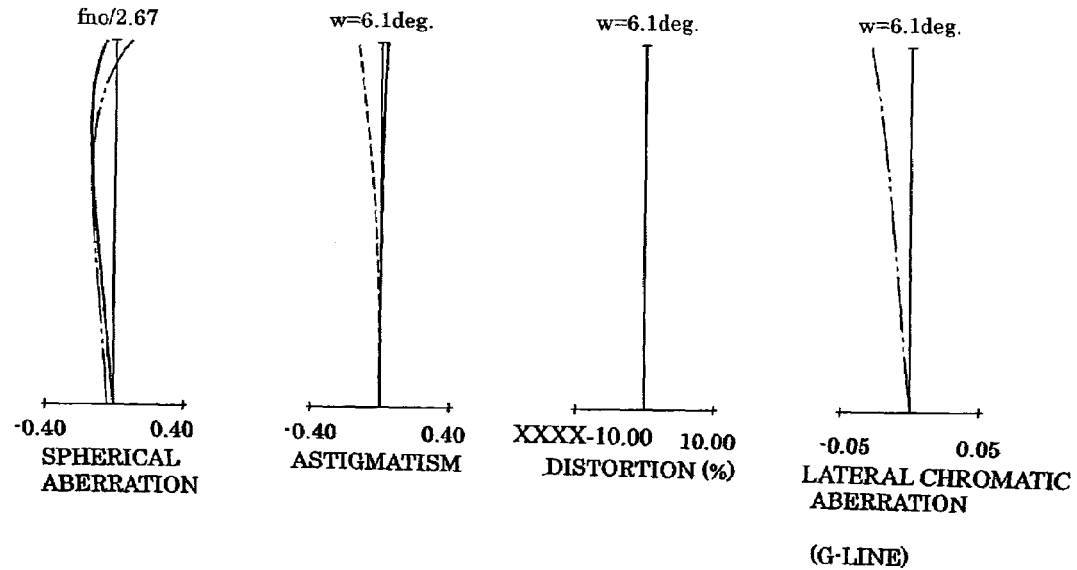
FIG. 22 is another longitudinal aberration diagram according to numerical example 3.
Figure 23:
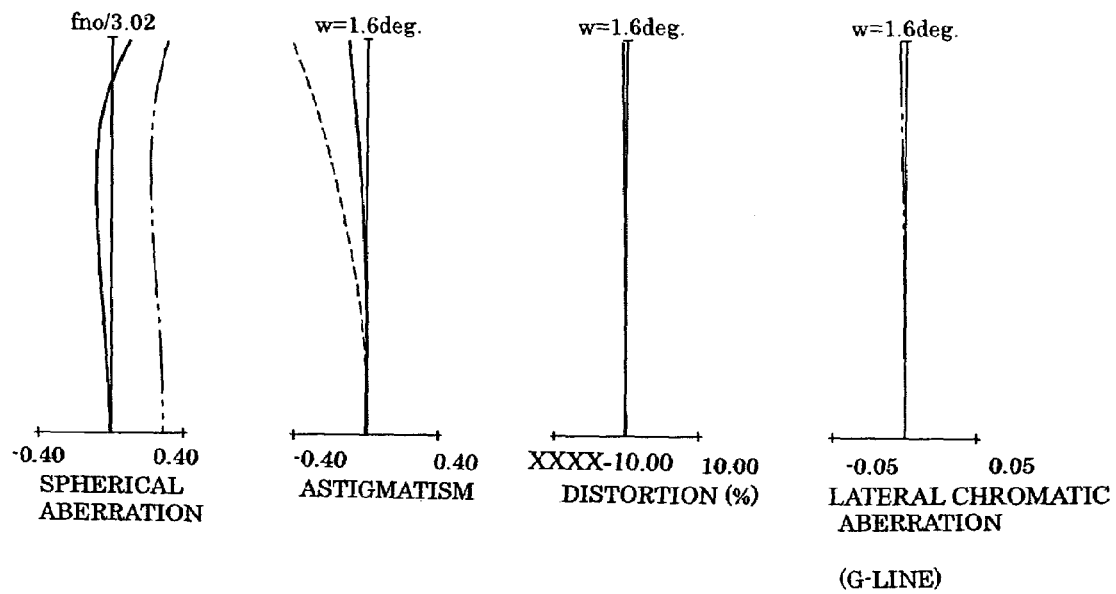
FIG. 23 is another longitudinal aberration diagram according to numerical example 3.

FIG. 21 shows a longitudinal aberration diagram according to numerical example 3 obtained when fx=fy=13.4 mm and the object distance is 2.5 m. FIG. 22 shows a longitudinal aberration diagram according to numerical example 3 obtained when fx=fy=51.4 mm and the object distance is 2.5 m. FIG. 23 shows a longitudinal aberration diagram according to numerical example 3 obtained when fx=fy=196.7 mm and the object distance is 2.5 m.

NUMERICAL EXAMPLE 3

Parameters of numerical example 3 are as follows:
fx=fy=13.409 to 196.715
Fx=Fy=2.67 to 3.02
2ω=22.3 to 1.6 degrees

TABLE 3

| | | | |
|---|---|---|---|
| r 1 = 1169.481 | d 1 = 2.40 | n 1 = 1.81265 | v 1 = 25.4 |
| r 2 = 98.429 | d 2 = 10.83 | n 2 = 1.51825 | v 2 = 64.2 |
| r 3 = −265.170 | d 3 = 0.20 | | |

TABLE 3-continued

| | | | |
|---|---|---|---|
| r 4 = 124.037 | d 4 = 8.29 | n 3 = 1.60548 | v 3 = 60.7 |
| r 5 = −281.395 | d 5 = 0.20 | | |
| r 6 = 51.797 | d 6 = 6.46 | n 4 = 1.64254 | v 4 = 60.1 |
| r 7 = 91.915 | d 7 = variable | | |
| r 8 = 71.045 | d 8 = 0.90 | n 5 = 1.82017 | v 5 = 46.6 |
| r 9 = −17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48916 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.564 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53438 | v17 = 48.8 |
| r30 = −30.063 | d30 = 1.20 | n18 = 1.80811 | v18 = 46.6 |
| r31 = 113.246 | d31 = 0.20 | | |
| r32 = 56.783 | d32 = 2.98 | n19 = 1.55098 | v19 = 45.8 |
| r33 = −10000.000 | d33 = 2.40 | | |
| r34 = 118.792 | d34 = 1.50 | n20 = 1.88815 | v20 = 40.8 |
| r35 = 23.524 | d35 = 7.79 | | |
| r36 = −47.979 | d36 = 1.50 | n21 = 1.88815 | v21 = 40.8 |
| r37 = −235.160 | d37 = 0.20 | | |
| r38 = 58.013 | d38 = 4.86 | n22 = 1.85504 | v22 = 23.8 |
| r39 = −80.709 | d39 = 34.28 | | |
| r40 = −24.454 | d40 = 1.50 | n23 = 1.80642 | v23 = 35.0 |
| r41 = −68.213 | d41 = 6.48 | n24 = 1.48915 | v24 = 70.2 |
| r42 = −44.146 | d42 = 0.20 | | |
| r43 = −4171.602 | d43 = 7.52 | n25 = 1.62286 | v25 = 60.3 |
| r44 = −29.849 | d44 = 0.20 | | |
| r45 = 42.035 | d45 = 5.28 | n26 = 1.62286 | v26 = 60.3 |
| r46 = 10000.000 | d46 = 4.00 | | |
| r47 = 0.000 | d47 = 33.00 | n27 = 1.61170 | v27 = 46.4 |
| r48 = 0.000 | d48 = 13.20 | n28 = 1.51825 | v28 = 64.2 |
| r49 = 0.000 | | | |
| Focal Length fx (= fy) | 13.409 | 51.358 | 196.715 |
| Variable Range | | | |
| d7 | 0.39 | 33.92 | 49.55 |
| d12 | 52.91 | 14.80 | 3.78 |
| d15 | 1.55 | 6.13 | 1.53 |

FOURTH EMBODIMENT

Figure 24:
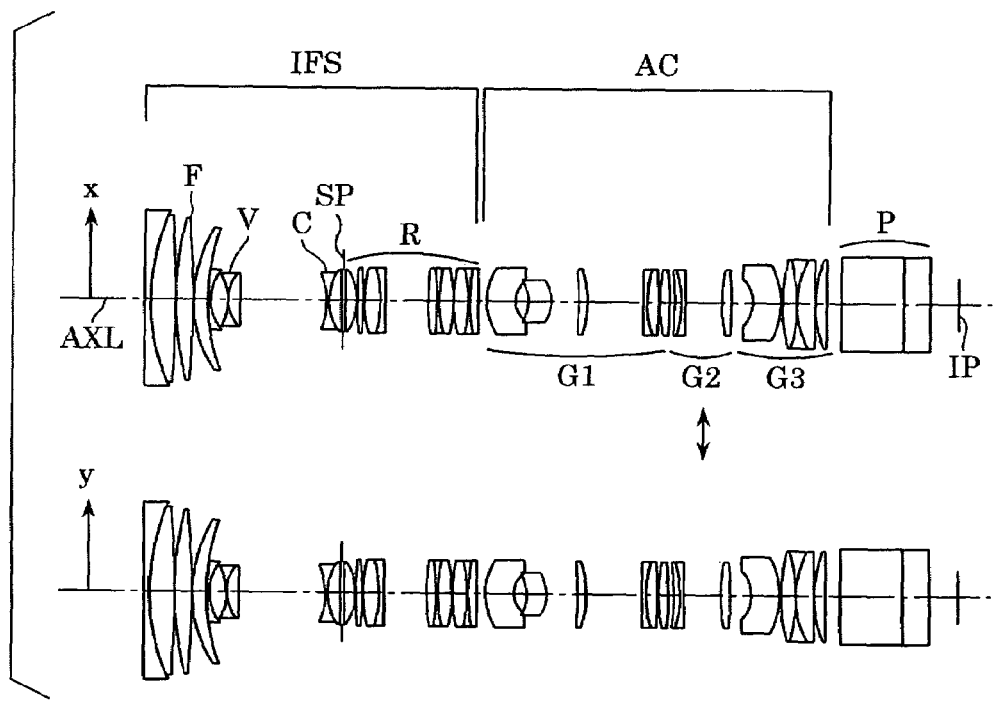
FIG. 24 shows sectional views in the x and y directions of a lens system according to a fourth embodiment (numerical example 4) of the present invention at the wide-angle end.

FIG. 24 shows the anamorphic converter AC with primary imaging according to the fourth embodiment (numerical example 4). Components included in the image-forming optical system IFS shown in FIG. 24 will be described below in the order from the object side. With reference to FIG. 24, a front focusing lens F has a positive refractive power, and a variator V for varying the magnification and has a negative refractive power. The variator V moves along an optical axis toward the image plane for the variation of magnification from the wide-angle end to the telephoto end.

In addition, a compensator C has a negative refractive power. The compensator C moves nonlinearly along the optical axis with a trajectory which is convex toward the object side in order to correct the displacement of the image plane during the variation of magnification. Thus, a variable power system is defined by the variator V and the compensator C.

In addition, a diaphragm SP and a relay lens R which combine have a positive refractive power are provided. The relay lens R is fixed during the variation of magnification.

In addition, a glass block P, such as a color separation prism and an optical filter, and an imaging device IP are provided in a shooting apparatus.

Next, the structure of the anamorphic converter AC according to numerical example 4 will be described below. The anamorphic converter AC includes a first lens unit G1 which includes three positive lens elements and three negative lens elements and which has a positive refractive power, a second lens unit G2 which includes three cylindrical lens elements, and a third lens unit G3 which has an image-forming function, which includes three positive lens elements and two negative lens elements, and which has a positive refractive power.

The value corresponding to Expression (20) is 43.4, and the value corresponding to Expression (22) is 23.5. Both of these values satisfy the respective conditions, and accordingly the aberrations are sufficiently corrected.

A focal length f1 of the first lens unit G1 and a focal length f3 of the third lens unit G3 are as follows:

$$f1=+26.494 \tag{38}$$

$$f3=+33.154 \tag{39}$$

Each of the three cylindrical lens elements included in the second lens unit G2 has a curvature only in the x direction, and reduces only the focal length in the x direction.

The aspect ratio AR1 of the image-forming section in the image plane of the image-forming optical system IFS and the aspect ratio AR2 of the effective image pickup area EPA of the imaging device IP are as follows:

$$AR1=2.35 \tag{40}$$

$$AR2=1.78 \tag{41}$$

In addition, the magnification $\beta x$ in the x direction and the magnification $\beta y$ in the y direction are as follows:

$$\beta x=0.947 \tag{42}$$

$$\beta y=1.252 \tag{43}$$

Therefore, the following equation is satisfied:

$$(AR1\cdot\beta x)/(AR2\cdot\beta y)=1.00 \tag{44}$$

Accordingly, the condition of Expression (13) is satisfied, and the anamorphic converter with primary imaging according to the present embodiment provides excellent optical performance and performs ideal aspect-ratio conversion.

In addition, the focal lengths fACx and fACy of the anamorphic converter AC itself in the x and y directions are as follows:

$$fACx=+151.304 \tag{45}$$

$$fACy=-3873.97 \tag{46}$$

Accordingly, the absolute values are large and the refractive power is low, so that the anamorphic converter AC is telecentric on both sides.

The cylindrical lens used in the present embodiment (numerical example) is made of glass.

Figure 25:
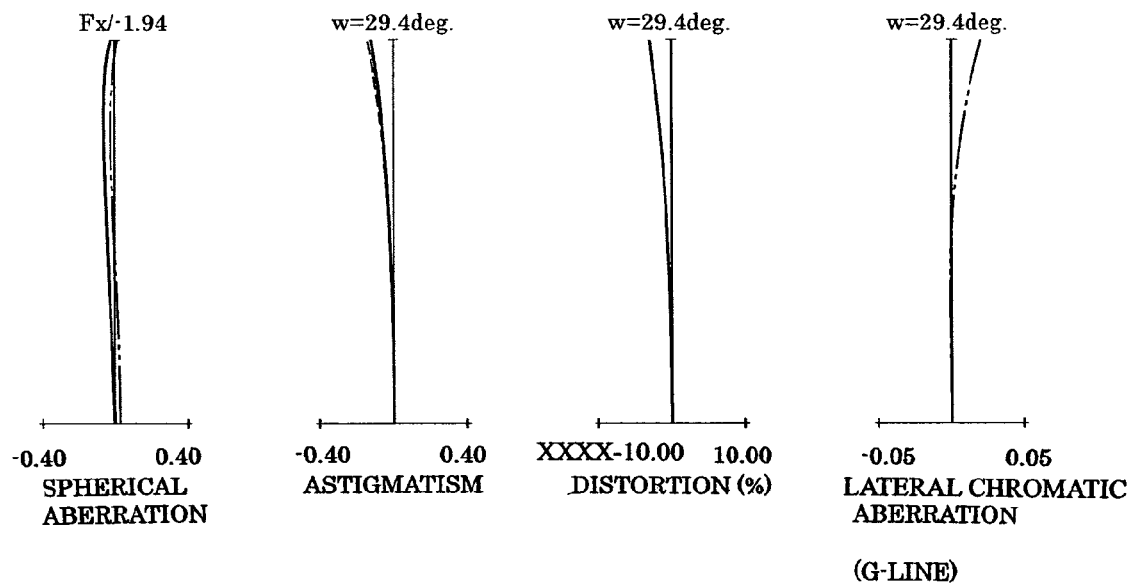
FIG. 25 is a longitudinal aberration diagram in the x direction according to numerical example 4.
Figure 26:
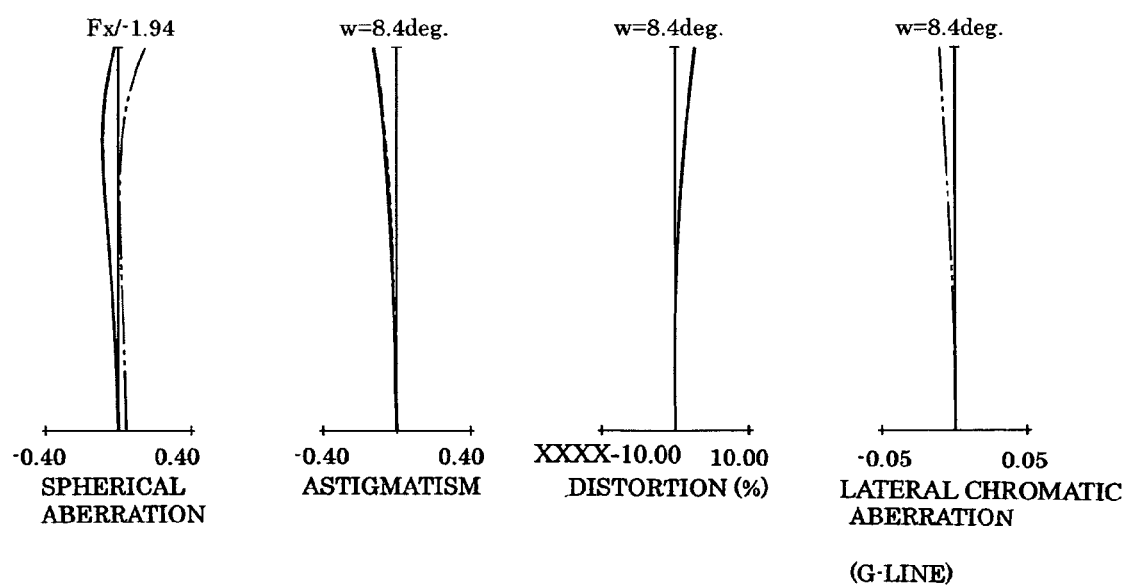
FIG. 26 is a longitudinal aberration diagram in the y direction according to numerical example 4.
Figure 27:
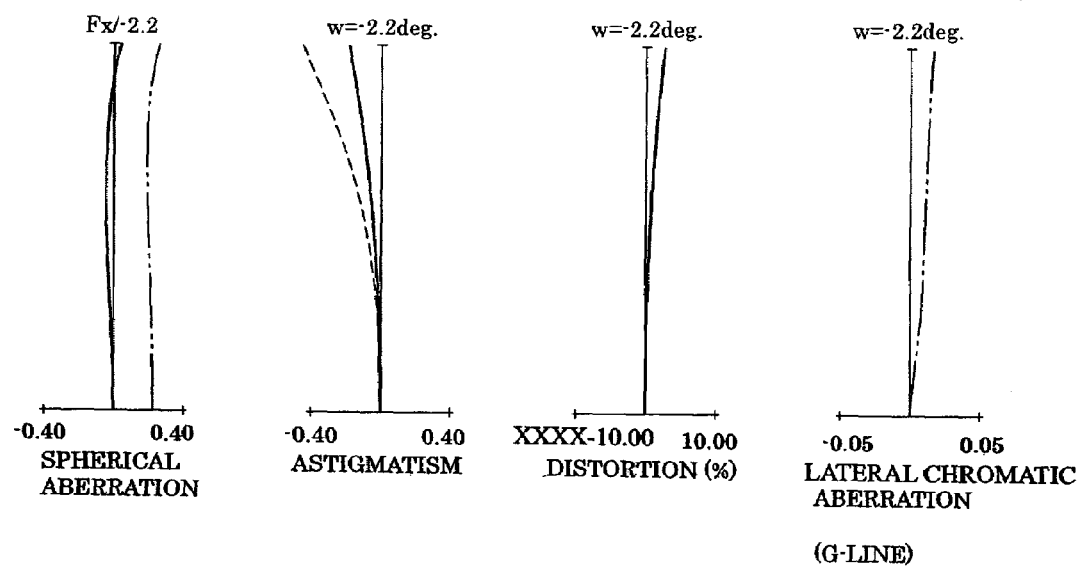
FIG. 27 is another longitudinal aberration diagram in the x direction according to numerical example 4.
Figure 28:
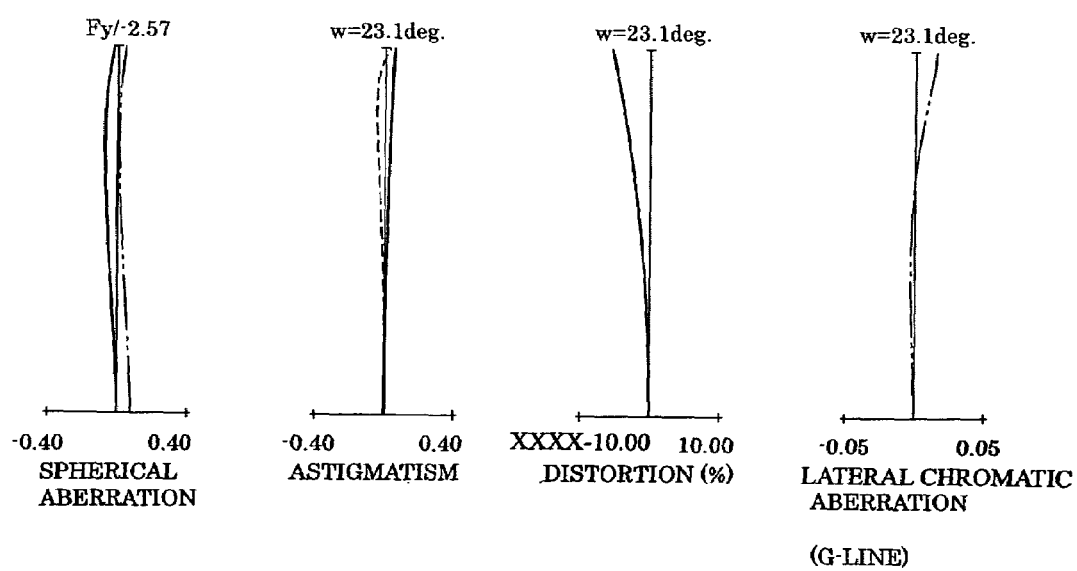
FIG. 28 is another longitudinal aberration diagram in the y direction according to numerical example 4.
Figure 29:
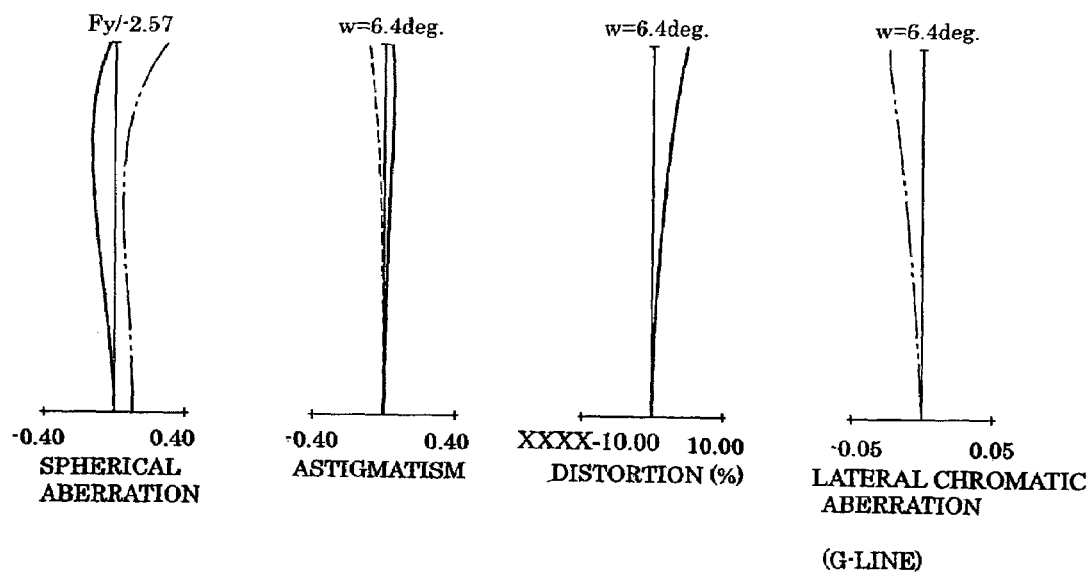
FIG. 29 is another longitudinal aberration diagram in the x direction according to numerical example 4.
Figure 30:
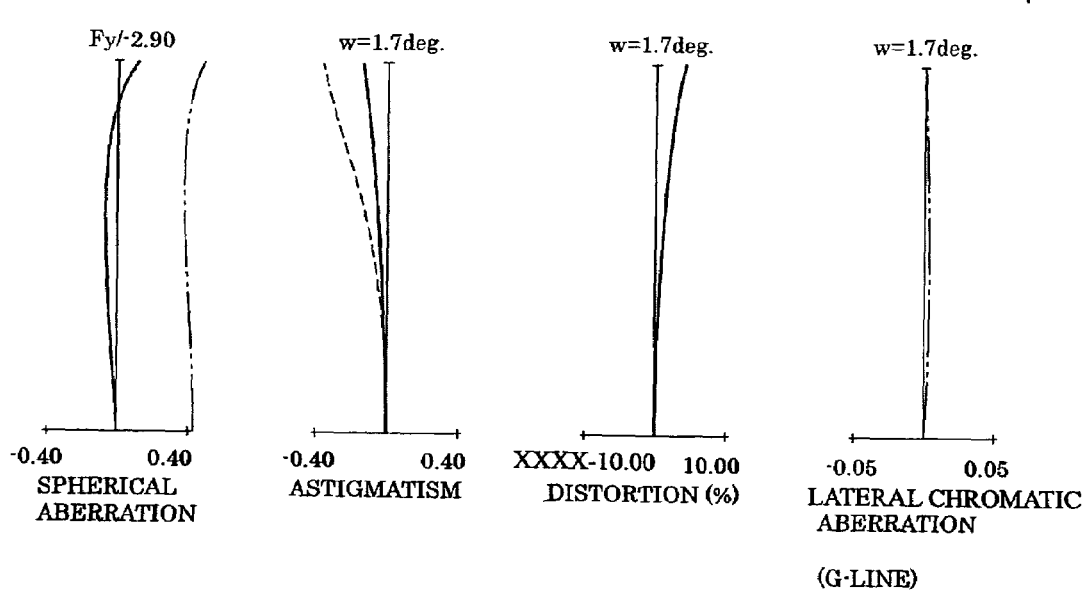
FIG. 30 is another longitudinal aberration diagram in the y direction according to numerical example 4.

FIG. 25 shows a longitudinal aberration diagram in the x direction according to numerical example 4 obtained when fx=−9.8 mm, fy=−12.9 mm, and the object distance is 2.5 m. FIG. 26 shows a longitudinal aberration diagram in the y direction according to numerical example 4 obtained when fx=−37.4 mm, fy=−49.4 mm, and the object distance is 2.5 m. FIG. 27 shows a longitudinal aberration diagram in the x direction according to numerical example 4 obtained when fx=−143.2 mm, fy=−189.2 mm, and the object distance is 2.5 m. FIG. 28 shows a longitudinal aberration diagram in the y direction according to numerical example 4 obtained when fx=−9.8 mm, fy=−12.9 mm, and the object distance is 2.5 m. FIG. 29 shows a longitudinal aberration diagram in the x direction according to numerical example 4 obtained when fx=−37.4 mm, fy=−49.4 mm, and the object distance is 2.5 m. FIG. 30 shows a longitudinal aberration diagram in the y direction according to numerical example 4 obtained when fx=−143.2 mm, fy=−189.2 mm, and the object distance is 2.5 m.

NUMERICAL EXAMPLE 4

Parameters of numerical example 4 are as follows:
fx=−9.759 to −143.160
fy=−12.894 to −189.152
Fx=−1.94 to −2.20
Fy=−2.57 to −2.90
2ωx=58.8 to 4.4 degrees
2ωy=46.2 to 3.3 degrees

TABLE 4

| | | | |
|---|---|---|---|
| r 1 = 1169.481 | d 1 = 2.40 | n 1 = 1.81265 | v 1 = 25.4 |
| r 2 = 98.429 | d 2 = 10.83 | n 2 = 1.51825 | v 2 = 64.2 |
| r 3 = −265.170 | d 3 = 0.20 | | |
| r 4 = 124.037 | d 4 = 8.29 | n 3 = 1.60548 | v 3 = 60.7 |
| r 5 = −281.395 | d 5 = 0.20 | | |
| r 6 = 51.797 | d 6 = 6.46 | n 4 = 1.64254 | v 4 = 60.1 |
| r 7 = 97.915 | d 7 = variable | | |
| r 8 = 71.045 | d 8 = 0.90 | n 5 = 1.82017 | v 5 = 46.6 |
| r 9 = −17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48916 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.564 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53438 | v17 = 48.8 |
| r30 = −30.063 | d30 = 1.20 | n18 = 1.80811 | v18 = 46.6 |
| r31 = 113.248 | d31 = 0.20 | | |
| r32 = 56.783 | d32 = 2.98 | n19 = 1.55098 | v19 = 45.8 |
| r33 = −10000.000 | d33 = 2.40 | | |
| r34 = 21.696 | d34 = 16.57 | n20 = 1.69979 | v20 = 55.5 |
| r35 = 8.476 | d35 = 6.19 | | |
| r36 = −15.464 | d36 = 12.05 | n21 = 1.83945 | v21 = 42.7 |
| r37 = −20.183 | d37 = 16.76 | | |
| r38 = −48.520 | d38 = 5.09 | n22 = 1.80811 | v22 = 46.6 |
| r39 = −21.439 | d39 = 28.76 | | |
| r40 = −176.476 | d40 = 1.50 | n23 = 1.88815 | v23 = 40.8 |
| r41 = 38.257 | d41 = 6.33 | n24 = 1.49845 | v24 = 81.5 |
| r42 = −39.544 | d42 = 0.20 | | |
| r43 = 71.600 | d43 = 5.89 | n25 = 1.49845 | v25 = 81.5 |
| r44 = −37.523 | d44 = 2.74 | | |
| r45 = 0.000 | d45 = 3.97 | n26 = 1.81264 | v26 = 25.4 |
| r46 = 0.000 | d46 = 2.00 | n27 = 1.77621 | v27 = 49.6 |
| r47 = 0.000 | d47 = 19.06 | | |

TABLE 4-continued

| | | | |
|---|---|---|---|
| r48 = 0.000 | d48 = 4.16 | n28 = 1.62286 | v28 = 60.3 |
| r49 = 0.000 | d49 = 7.70 | | |
| r50 = −20.089 | d50 = 17.02 | n29 = 1.83945 | v29 = 42.7 |
| r51 = −31.029 | d51 = 1.00 | | |
| r52 = 69.021 | d52 = 7.55 | n30 = 1.45720 | v30 = 90.3 |
| r53 = −55.389 | d53 = 0.20 | | |
| r54 = 2333.417 | d54 = 1.50 | n31 = 1.83932 | v31 = 37.2 |
| r55 = 27.120 | d55 = 8.74 | n32 = 1.45720 | v32 = 90.3 |
| r56 = −108.729 | d56 = 0.20 | | |
| r57 = 31.812 | d57 = 6.03 | n33 = 1.62286 | v33 = 60.3 |
| r58 = −10000.000 | d58 = 6.55 | | |
| r59 = 0.000 | d59 = 33.00 | n34 = 1.61170 | v34 = 46.4 |
| r60 = 0.000 | d60 = 13.20 | n35 = 1.51825 | v35 = 64.2 |
| r61 = 0.000 | | | |

* r40 to r44 are cylindrical lenses.

Curvatures in x and y directions are as follows:

| | x | y |
|---|---|---|
| r45 | −78.889 | 0 |
| r46 | −36.698 | 0 |
| r47 | 209.589 | 0 |
| r48 | 288.285 | 0 |
| r49 | −72.810 | 0 |

| Focal Length fx | −9.759 | 37.376 | −143.160 |
|---|---|---|---|
| fy | −12.894 | −49.383 | −189.152 |
| Variable Range | | | |
| d7 | 0.39 | 33.92 | 49.55 |
| d12 | 52.91 | 14.80 | 3.78 |
| d15 | 1.55 | 6.13 | 1.53 |

FIFTH EMBODIMENT

Figure 31:
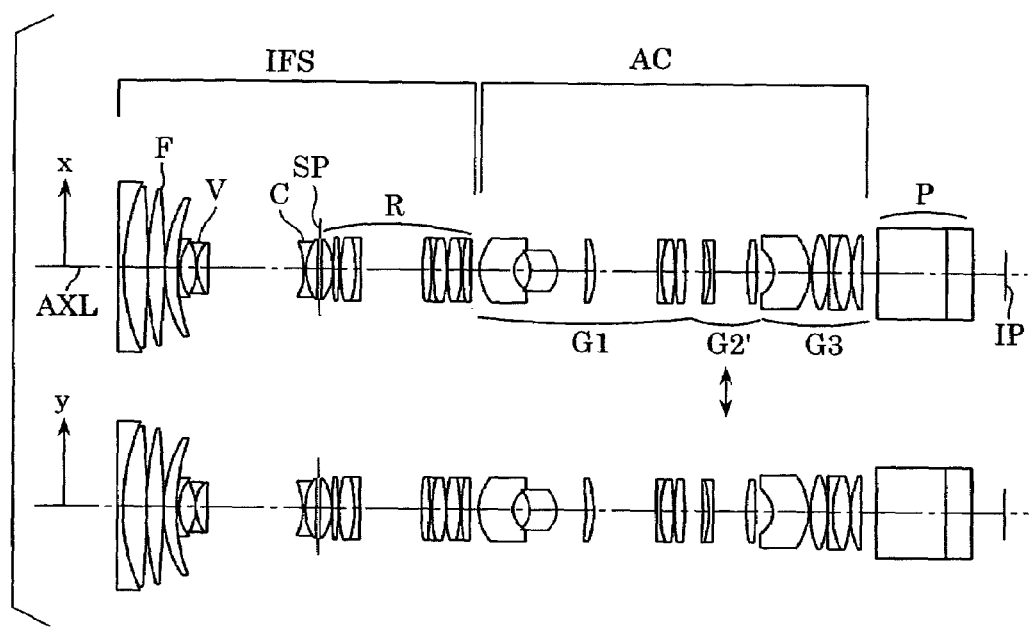
FIG. 31 shows sectional views in the x and y directions of a lens system according to a fifth embodiment (numerical example 5) of the present invention at the wide-angle end.

The anamorphic converter AC according to the fifth embodiment (numerical example 5) shown in FIG. 31 is similar to the anamorphic converter AC with primary imaging according to the fourth embodiment except the structure of the second lens unit G2 is changed. The structures of the zoom lens which functions as the image-forming optical system IFS and the first and third lens units G1 and G3 are similar to those of the fourth embodiment.

Next, the structure of the anamorphic converter AC according to numerical example 5 will be described below. The anamorphic converter AC includes a first lens unit G1 which has a positive refractive power, a second lens unit G2' including three toric lens elements, and a third lens unit G3 which has an image-forming function and a positive refractive power. Each of the three cylindrical lens elements included in the second lens unit G2' has different curvatures in the x and y directions, and increases the focal length in the y direction with respect to that in the x direction.

The aspect ratio AR1 of the image-forming section in the image plane of the image-forming optical system IFS and the aspect ratio AR2 of the effective image pickup area of the imaging device IP are as follows:

AR1=1.85 (47)

AR2=1.78 (48)

In addition, the magnification βx in the x direction and the magnification βy in the y direction are as follows:

βx=0.991 (49)

βy=1.030 (50)

Therefore, the following equation is satisfied:

(AR1·βx)/(AR2·βy)=1.00 (51)

Accordingly, the condition of Expression (13) is satisfied, and the anamorphic converter according to the present embodiment provides excellent optical performance and performs ideal aspect-ratio conversion.

Figure 32:
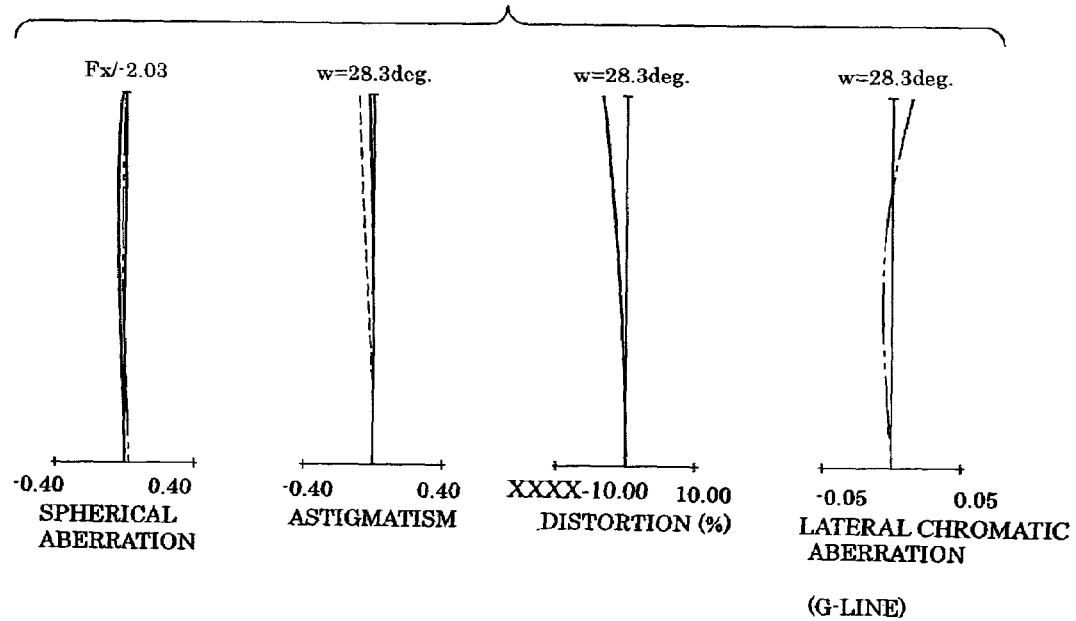
FIG. 32 a longitudinal aberration diagram in the x direction according to numerical example 5.
Figure 33:
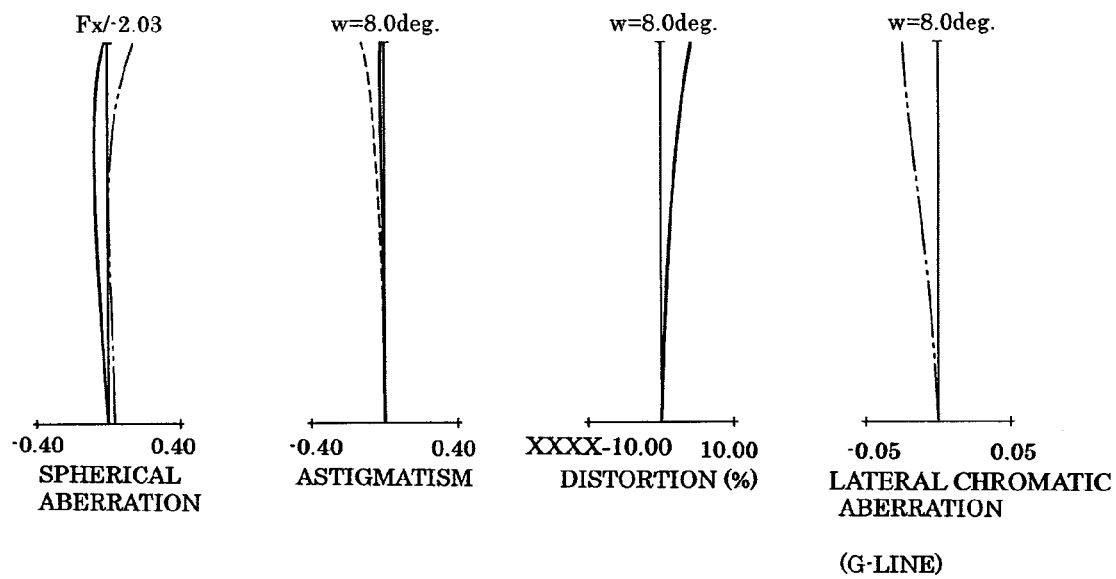
FIG. 33 is another longitudinal aberration diagram in the x direction according to numerical example 5.
Figure 34:
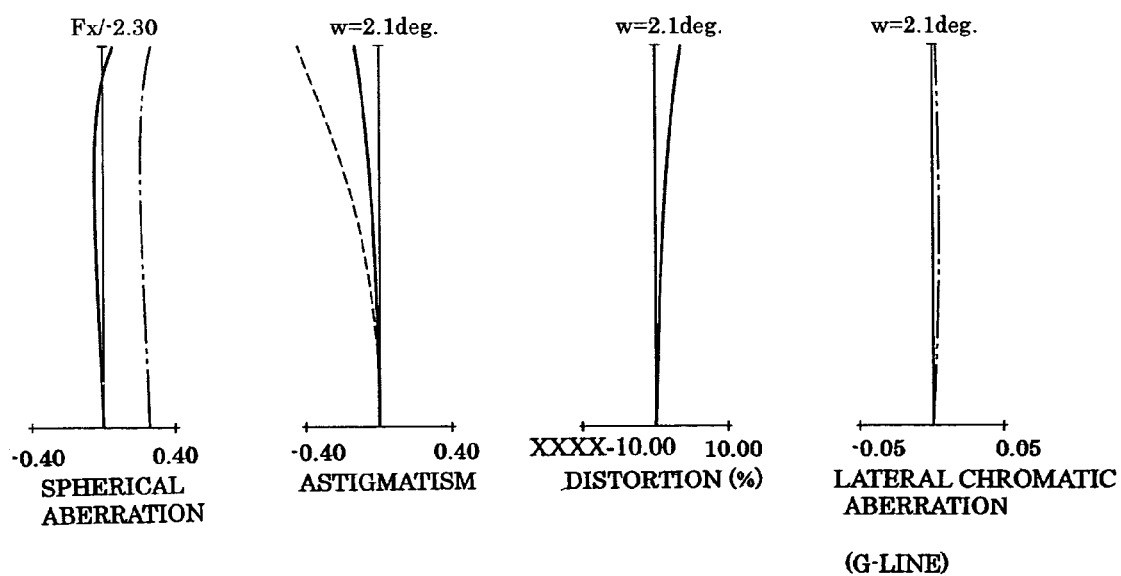
FIG. 34 is another longitudinal aberration diagram in the x direction according to numerical example 5.
Figure 35:
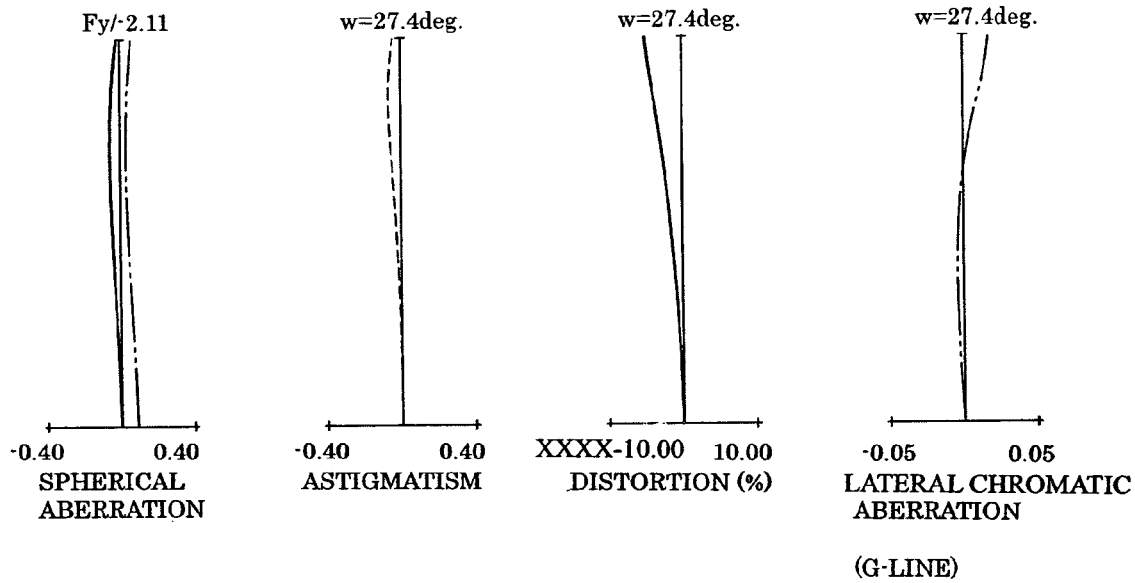
FIG. 35 is a longitudinal aberration diagram in the y direction according to numerical example 5.
Figure 36:
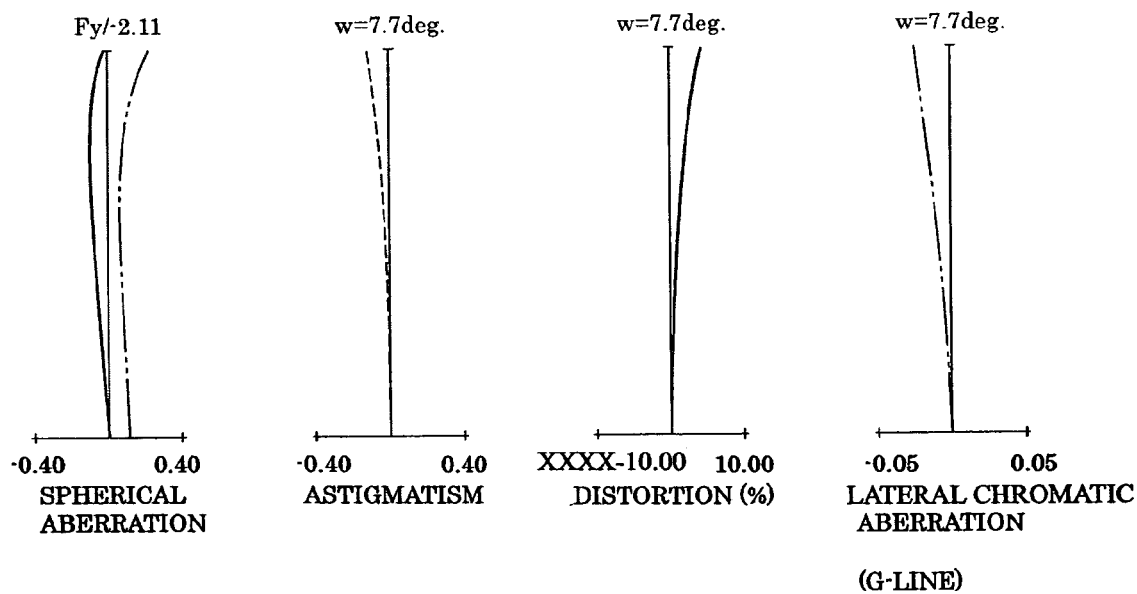
FIG. 36 is another longitudinal aberration diagram in the y direction according to numerical example 5.
Figure 37:
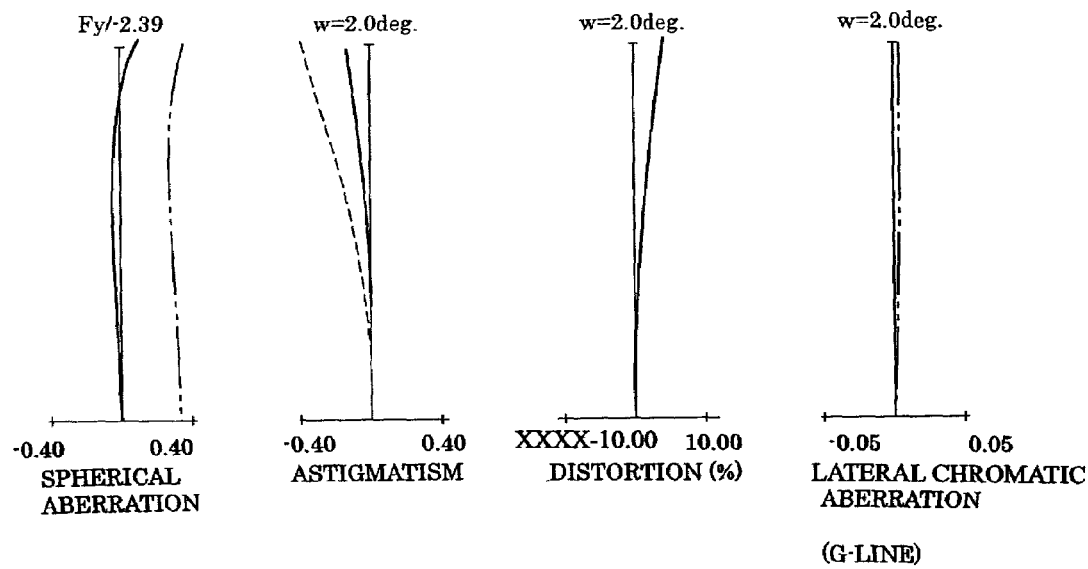
FIG. 37 is another longitudinal aberration diagram in the y direction according to numerical example 5.

FIG. 32 shows a longitudinal aberration diagram in the x direction according to numerical example 5 obtained when fx=−10.2 mm, fy=−10.6 mm, and the object distance is 2.5 m. FIG. 33 shows a longitudinal aberration diagram in the x direction according to numerical example 5 obtained when fx=−39.1 mm, fy=−40.7 mm, and the object distance is 2.5 m. FIG. 34 shows a longitudinal aberration diagram in the x direction according to numerical example 5 obtained when fx=−149.7 mm, fy=−155.8 mm, and the object distance is 2.5 m. FIG. 35 shows a longitudinal aberration diagram in the y direction according to numerical example 5 obtained when fx=−10.2 mm, fy=−10.6 mm, and the object distance is 2.5 m. FIG. 36 shows a longitudinal aberration diagram in the y direction according to numerical example 5 obtained when fx=−39.1 mm, fy=−40.7 mm, and the object distance is 2.5 m. FIG. 37 shows a longitudinal aberration diagram in the y direction according to numerical example 5 obtained when fx=−149.7 mm, fy=−155.8 mm, and the object distance is 2.5 m.

NUMERICAL EXAMPLE 5

Parameters of numerical example 5 are as follows:
fx=−10.207 to −149.741 −39.094
fy=−10.621 to −155.812 −40.679
Fx=−2.03 to −2.30
Fy=−2.11 to −2.39
2ωx=56.6 to 4.2 degrees
2ωy=54.8 to 4.0 degrees

TABLE 5

| | | | |
|---|---|---|---|
| r 1 = 1169.481 | d 1 = 2.40 | n 1 = 1.81265 | v 1 = 25.4 |
| r 2 = 98.429 | d 2 = 10.83 | n 2 = 1.51825 | v 2 = 64.2 |
| r 3 = −265.170 | d 3 = 0.20 | | |
| r 4 = 124.037 | d 4 = 8.29 | n 3 = 1.60548 | v 3 = 60.7 |
| r 5 = −281.395 | d 5 = 0.20 | | |
| r 6 = 51.797 | d 6 = 6.46 | n 4 = 1.64254 | v 4 = 60.1 |
| r 7 = 91.915 | d 7 = variable | | |
| r 8 = 71.045 | d 8 = 0.90 | n 5 = 1.82017 | v 5 = 46.6 |
| r 9 = −17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48916 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.504 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53438 | v17 = 48.8 |
| r30 = −30.063 | d30 = 1.20 | n18 = 1.80811 | v18 = 46.6 |
| r31 = 113.248 | d31 = 0.20 | | |
| r32 = 56.783 | d32 = 2.98 | n19 = 1.55098 | v19 = 45.8 |
| r33 = −10000.000 | d33 = 2.40 | | |
| r34 = 21.696 | d34 = 16.57 | n20 = 1.69979 | v20 = 55.5 |
| r35 = 8.476 | d35 = 6.19 | | |
| r36 = −15.464 | d36 = 12.05 | n21 = 1.83945 | v21 = 42.7 |
| r37 = −20.183 | d37 = 16.76 | | |

TABLE 5-continued

| | | | |
|---|---|---|---|
| r38 = −48.520 | d38 = 5.09 | n22 = 1.80811 | v22 = 46.6 |
| r39 = −21.439 | d39 = 28.76 | | |
| r40 = −176.476 | d40 = 1.50 | n23 = 1.88815 | v23 = 40.8 |
| r41 = 38.257 | d41 = 6.33 | n24 = 1.49845 | v24 = 81.5 |
| r42 = −39.544 | d42 = 0.20 | | |
| r43 = 71.600 | d43 = 5.69 | n25 = 1.49845 | v25 = 81.5 |
| r44 = −37.523 | d44 = 2.74 | | |
| r45 = −105.900 | d45 = 3.71 | n26 = 1.81264 | v26 = 25.4 |
| r46 = −58.265 | d46 = 2.00 | n27 = 1.77621 | v27 = 49.6 |
| r47 = 202.449 | d47 = 15.18 | | |
| r48 = 183.157 | d48 = 4.10 | n28 = 1.62286 | v28 = 60.3 |
| r49 = −100.060 | d49 = 7.50 | | |
| r50 = −20.089 | d50 = 17.02 | n29 = 1.83945 | v29 = 42.7 |
| r51 = −31.029 | d51 = 1.00 | | |
| r52 = 69.021 | d52 = 7.55 | n30 = 1.45720 | v30 = 90.3 |
| r53 = −55.389 | d53 = 0.20 | | |
| r54 = 2333.417 | d54 = 1.50 | n31 = 1.83932 | v31 = 37.2 |
| r55 = 27.120 | d55 = 8.74 | n32 = 1.45720 | v32 = 90.3 |
| r56 = −108.729 | d56 = 0.20 | | |
| r57 = 31.812 | d57 = 6.03 | n33 = 1.62286 | v33 = 60.3 |
| r58 = −10000.000 | d58 = 6.55 | | |
| r59 = 0.000 | d59 = 33.00 | n34 = 1.61170 | v34 = 46.4 |
| r60 = 0.000 | d60 = 13.20 | n35 = 1.51825 | v35 = 64.2 |
| r61 = 0.000 | | | |

* r40 to r44 are cylindrical lenses.

Curvatures in x and y directions are as follows:

| | x | y |
|---|---|---|
| r45 | −81.973 | −105.900 |
| r46 | −39.866 | −58.265 |
| r47 | 189.642 | 202.449 |
| r48 | 218.599 | 183.157 |
| r49 | −75.076 | −100.060 |
| Focal Length fx | −10.207 | −39.094 | −149.741 |
| fy | −10.621 | −40.679 | −155.812 |
| Variable Range | | | |
| d7 | 0.39 | 33.92 | 49.55 |
| d12 | 52.91 | 14.80 | 3.78 |
| d15 | 1.55 | 6.13 | 1.53 |

SIXTH EMBODIMENT

Figure 38:
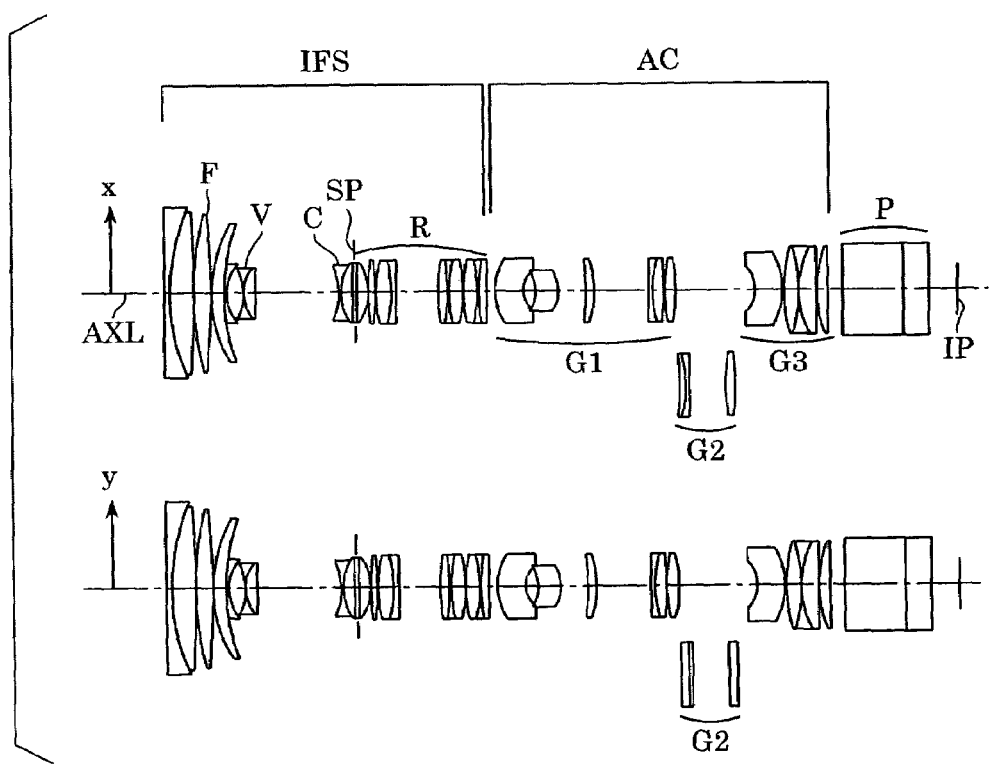
FIG. 38 shows sectional views of a lens system according to a sixth embodiment (numerical example 6) of the present invention at the wide-angle end.

The anamorphic converter AC according to the sixth embodiment (numerical example 6) shown in FIG. 38 corresponds to the anamorphic converter AC according to the first embodiment in the state in which the second lens unit G2 is removed. The structures of the zoom lens which functions as the image-forming optical system IFS and the first and third lens units G1 and G3 in the anamorphic converter AC are similar to those of the fourth embodiment.

Next, the structure of the anamorphic converter AC according to numerical example 6 will be described below. The anamorphic converter AC includes a first lens unit G1 which has a positive refractive power and a third lens unit G3 which has an image-forming function and a positive refractive power.

The magnification βx in the x direction and the magnification βy in the y direction are as follows:

$$\beta x = \beta y = -1.260 \quad (52)$$

Thus, a function as a teleconverter (magnification-converting optical system) is provided.

Figure 39:
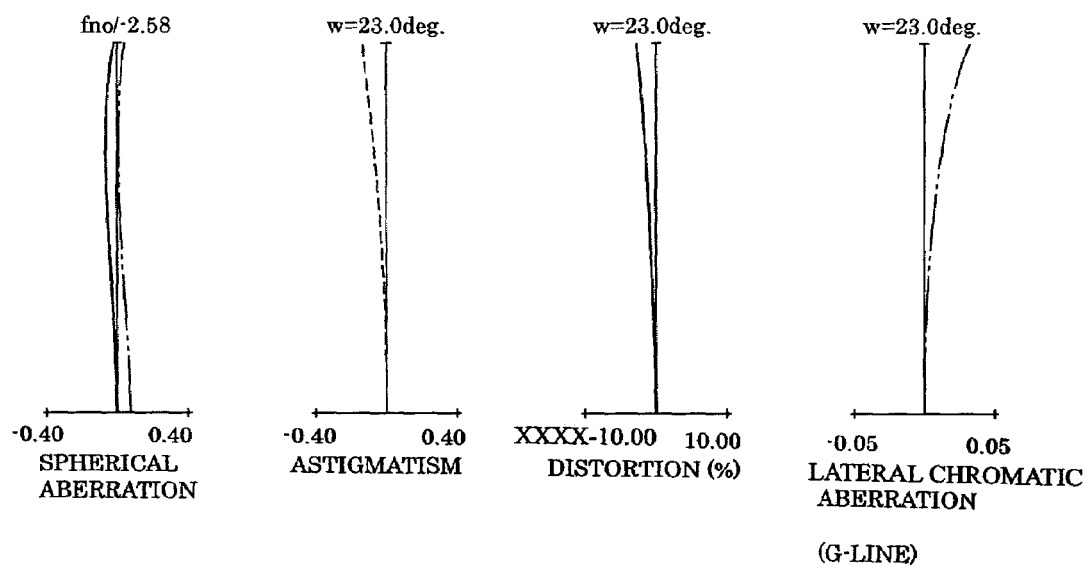
FIG. 39 is a longitudinal aberration diagram according to numerical example 6.
Figure 40:
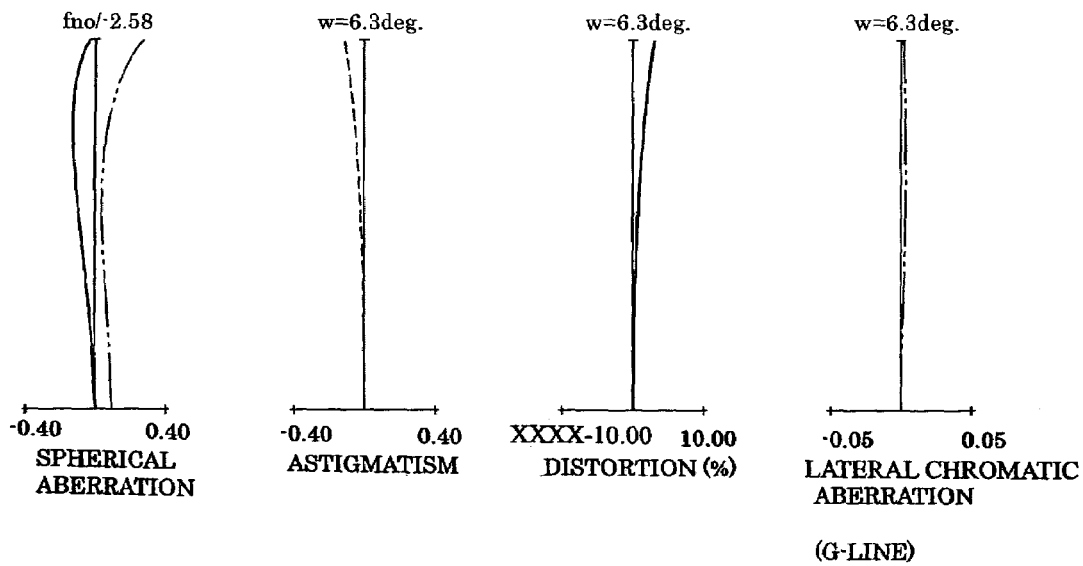
FIG. 40 is another longitudinal aberration diagram according to numerical example 6.
Figure 41:
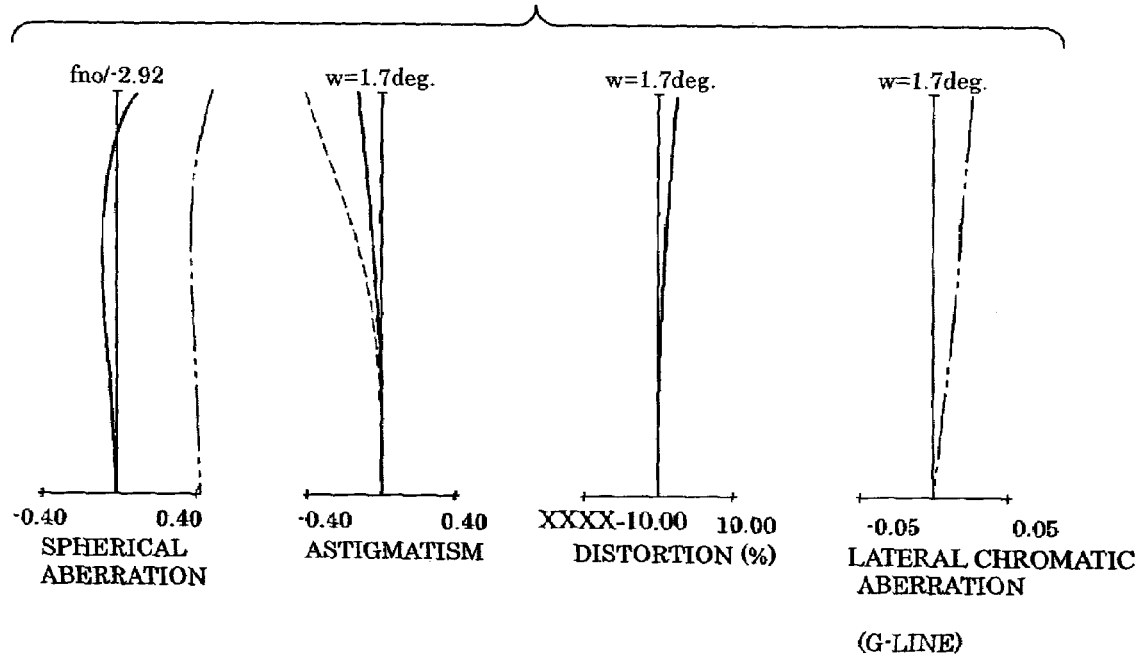
FIG. 41 is another longitudinal aberration diagram according to numerical example 6.

FIG. 39 shows a longitudinal aberration diagram according to numerical example 6 obtained when fx=fy=−13.0 mm and the object distance is 2.5 m. FIG. 40 shows a longitudinal aberration diagram according to numerical example 6 obtained when fx=fy=−49.7 mm and the object distance is 2.5 m. FIG. 41 shows a longitudinal aberration diagram according to numerical example 6 obtained when fy=−190.4 mm and the object distance is 2.5 m.

NUMERICAL EXAMPLE 6

Parameters of numerical example 6 are as follows:
fx=fy=−12.980 to −190.421
Fx=Fy=−2.58 to −2.92
2ω=45.9 to 3.3 degrees

TABLE 6

| | | | |
|---|---|---|---|
| r 1 = 1169.481 | d 1 = 2.40 | n 1 = 1.81265 | v 1 = 25.4 |
| r 2 = 98.429 | d 2 = 10.83 | n 2 = 1.51825 | v 2 = 64.2 |
| r 3 = −265.170 | d 3 = 0.20 | | |
| r 4 = 124.037 | d 4 = 8.29 | n 3 = 1.60548 | v 3 = 60.7 |
| r 5 = −281.395 | d 5 = 0.20 | | |
| r 6 = 51.797 | d 6 = 6.46 | n 4 = 1.64254 | v 4 = 60.1 |
| r 7 = 97.915 | d 7 = variable | | |
| r 8 = 71.045 | d 8 = 0.90 | n 5 = 1.82017 | v 5 = 46.6 |
| r 9 = −17.601 | d 9 = 6.01 | | |
| r10 = −21.542 | d10 = 0.90 | n 6 = 1.77621 | v 6 = 49.6 |
| r11 = 18.397 | d11 = 4.63 | n 7 = 1.85501 | v 7 = 23.9 |
| r12 = −4295.134 | d12 = variable | | |
| r13 = −27.245 | d13 = 0.90 | n 8 = 1.79013 | v 8 = 44.2 |
| r14 = 31.613 | d14 = 3.84 | n 9 = 1.85501 | v 9 = 23.9 |
| r15 = 1125.345 | d15 = variable | | |
| r16 = 0.000 (diaphragm) | d16 = 1.60 | | |
| r17 = 10000.000 | d17 = 4.02 | n10 = 1.73234 | v10 = 54.7 |
| r18 = −32.342 | d18 = 0.20 | | |
| r19 = 107.938 | d19 = 3.60 | n11 = 1.48916 | v11 = 70.2 |
| r20 = −121.402 | d20 = 0.20 | | |
| r21 = 37.891 | d21 = 7.17 | n12 = 1.48915 | v12 = 70.2 |
| r22 = −36.452 | d22 = 1.20 | n13 = 1.83932 | v13 = 37.2 |
| r23 = 177.431 | d23 = 30.00 | | |
| r24 = 48.564 | d24 = 4.26 | n14 = 1.48915 | v14 = 70.2 |
| r25 = −193.706 | d25 = 0.20 | | |
| r26 = −210.911 | d26 = 1.20 | n15 = 1.83932 | v15 = 37.2 |
| r27 = 39.960 | d27 = 6.49 | n16 = 1.48915 | v16 = 70.2 |
| r28 = −33.683 | d28 = 0.20 | | |
| r29 = 43.464 | d29 = 6.21 | n17 = 1.53438 | v17 = 48.8 |
| r30 = −30.063 | d30 = 1.20 | n18 = 1.80811 | v18 = 46.6 |
| r31 = 113.248 | d31 = 0.20 | | |
| r32 = 56.783 | d32 = 2.98 | n19 = 1.55098 | v19 = 45.8 |
| r33 = −10000.000 | d33 = 2.40 | | |
| r34 = 21.696 | d34 = 16.57 | n20 = 1.69979 | v20 = 55.5 |
| r35 = 8.476 | d35 = 6.19 | | |
| r36 = −15.464 | d36 = 12.05 | n21 = 1.83945 | v21 = 42.7 |
| r37 = −20.183 | d37 = 16.76 | | |
| r38 = −48.520 | d38 = 5.09 | n22 = 1.80811 | v22 = 46.6 |
| r39 = −21.439 | d39 = 28.76 | | |
| r40 = −176.476 | d40 = 1.50 | n23 = 1.88815 | v23 = 40.8 |
| r41 = 38.257 | d41 = 6.33 | n24 = 1.49845 | v24 = 81.5 |
| r42 = −39.544 | d42 = 0.20 | | |
| r43 = 71.600 | d43 = 5.69 | n25 = 1.49845 | v25 = 81.5 |
| r44 = −37.523 | d44 = 2.74 | | |
| r45 = −20.089 | d45 = 17.02 | n26 = 1.83945 | v26 = 42.7 |
| r46 = −31.029 | d46 = 1.00 | | |
| r47 = 69.021 | d47 = 7.55 | n27 = 1.45720 | v27 = 90.3 |
| r48 = −55.389 | d48 = 0.20 | | |
| r49 = 2333.417 | d49 = 1.50 | n28 = 1.83932 | v28 = 37.2 |
| r50 = 27.120 | d50 = 8.74 | n29 = 1.45720 | v29 = 90.3 |
| r51 = −108.729 | d51 = 0.20 | | |
| r52 = 31.812 | d52 = 6.03 | n30 = 1.62286 | v30 = 60.3 |
| r53 = −10000.000 | d53 = 6.55 | | |
| r54 = 0.000 | d54 = 33.00 | n31 = 1.61170 | v31 = 46.4 |
| r55 = 0.000 | d55 = 13.20 | n32 = 1.51825 | v32 = 64.2 |
| r56 = 0.000 | | | |
| Focal Length fx (= fy) | −12.980 | −49.71 | −190.421 |
| Variable Range | | | |
| d7 | 0.39 | 33.92 | 49.55 |
| d12 | 52.91 | 14.80 | 3.78 |
| d15 | 1.55 | 6.13 | 1.53 |

FIG. 43 shows a longitudinal aberration diagram obtained by a lens system before the insertion of the anamorphic converter AC according to numerical examples 1 to 6 when f=10.3 mm and the object distance is 2.5 m. FIG. 44 shows a longitudinal aberration diagram obtained by the lens system before the insertion of the anamorphic converter AC according to numerical examples 1 to 6 when f=39.5 mm and the object distance is 2.5 m. FIG. 45 shows a longitudinal aberration diagram obtained by the lens system before the insertion of the anamorphic converter AC according to numerical examples 1 to 6 when f=151.1 mm and the object distance is 2.5 m.

According to the embodiments of the present invention, since the second lens unit including the anamorphic lens is movable between the first and the second states, a small, rear-converter-type anamorphic converter which provides high optical performance and which performs various aspect-ratio conversions is obtained.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-117216 filed Apr. 12, 2004, which is hereby incorporated by reference herein.

What is claimed is:

1. An anamorphic converter disposed at an image side of an image-forming optical system, comprising:
   first, second and third lens units positioned in order from an object side to the image side;
   the first lens unit having one of positive optical power and negative optical power;
   the second lens unit including an anamorphic lens; and
   the third lens unit having positive optical power,
   wherein the second lens unit has a first state in which the second lens unit is positioned between the first and third lens units, and a second state in which the second lens unit is removed from the position between the first lens unit and the third lens unit;
   wherein, in the second state of the second lens unit, the first lens unit and the third lens unit cooperate as a magnification-converting optical system.

2. The anamorphic converter according to claim 1, wherein the first lens unit has positive optical power.

3. The anamorphic converter according to claim 2, wherein the first lens unit includes a plurality of positive lens elements and a negative lens element, and wherein an average Abbe number of the positive lens elements (vp1) and an average Abbe number of the negative lens element (vn1) satisfy the following expression:

$$vp1-vn1>10.$$

4. The anamorphic converter according to claim 1, wherein the second lens unit receives substantially collimated light.

5. The anamorphic converter according to claim 1, wherein the second lens unit includes a first anamorphic lens having positive optical power in a cross section perpendicular to an optical axis and a second anamorphic lens having negative optical power in the cross section.

6. The anamorphic converter according to claim 1, wherein the third lens unit includes a plurality of positive lens elements and a negative lens element, and wherein an average Abbe number of the positive lens elements (vp3) and an average Abbe number of the negative lens element (vn3) satisfy the following expression:

$$vp3-vn3>20.$$

7. The anamorphic converter according to claim 1, wherein the second lens unit is rotatable about an optical axis of the anamorphic converter.

8. The anamorphic converter according to claim 1, wherein the object side and the image side of the second lens unit are reversible.

9. The anamorphic converter according to claim 1, wherein the second lens unit includes at least two lens elements, and a variable gap between the at least two lens elements.

10. The anamorphic converter according to claim 1, wherein, when an image of an object is Funned on an imaging device, a focal-length magnification in an x section including an optical axis of the anamorphic converter ($\beta x$), a focal-length magnification in a y-section which includes the optical axis and which is perpendicular to the x section ($\beta y$), an aspect ratio of an image-forming section in an image plane of the image-forming optical system (AR1), and an aspect ratio of an effective image pickup area of the imaging device (AR2) satisfy the following expression:

$$0.9>(AR1\cdot\beta x)/(AR2\cdot\beta y)>1.1.$$

11. The anamorphic converter according to claim 1, wherein, when an image of an object is formed on an imaging device, a focal-length magnification in an x section including an optical axis of the anamorphic converter ($\beta x$), a focal-length magnification in a y section which includes the optical axis and which is perpendicular to the x section ($\beta y$), an aspect ratio of an image-funning section in an image plane of the image-forming optical system (AR1), and an aspect ratio of an effective image pickup area of the imaging device (AR2) satisfy the following expression:

$$1>(AR2^2+1)\cdot\beta y^2/(AR1^2+1)>2.6.$$

12. A lens system comprising:
   the anamorphic converter according to claim 1; and
   an image-forming optical system disposed at the object side of the anamorphic-converter.

13. A shooting system comprising:
   the anamorphic converter according to claim 1;
   an image-forming optical system disposed at the object side of the anamorphic converter; and
   an imaging device disposed at the image side of the anamorphic converter, the imaging device performing photoelectric conversion of an object image.

14. An anamorphic converter disposed at an image side of an image-forming optical system, comprising:
   first, second and third lens units positioned in order from an object side to the image side;
   the first lens unit having one of positive optical power and negative optical power;
   the second lens unit including an anamorphic lens; and
   the third lens unit having positive optical power,
   wherein the second lens unit has a first state in which the second lens unit is positioned between the first and third lens units, and a second state in which the second lens unit is removed from the position between the list lens unit and the third lens unit,
   wherein the first lens unit has negative optical power, and
   wherein the first lens unit includes a positive lens element and a plurality of negative lens elements, and wherein an average Abbe number of the positive lens element (vp1) and an average Abbe number of the negative lens elements (vn1) satisfy the following expression:

$$vn1-vp1>10.$$

15. A lens system comprising:
the anamorphic converter according to claim 14; and
an image-forming optical system disposed at the object side of the anamorphic converter.

16. A shooting system comprising:
the anamorphic converter according to claim 14;
an image-forming optical system disposed at the object side of the anamorphic converter; and
an imaging device disposed at the image side of the anamorphic converter, tile imaging device performing photoelectric conversion of an object image.

* * * * *